US011393451B1

(12) United States Patent
Srinivasan et al.

(10) Patent No.: US 11,393,451 B1
(45) Date of Patent: Jul. 19, 2022

(54) LINKED CONTENT IN VOICE USER INTERFACE

(71) Applicant: Amazon Technologies, Inc., Seattle, WA (US)

(72) Inventors: Arvind Srinivasan, Seattle, WA (US); Frédéric Johan Georges Deramat, Seattle, WA (US); Kevin Shude Lin, Seattle, WA (US); Saiprasad Satya Kapila, Redmond, WA (US); Andrew Stuart Huntwork, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/472,850

(22) Filed: Mar. 29, 2017

(51) Int. Cl.
G10L 13/08 (2013.01)
G10L 15/22 (2006.01)
G10L 15/30 (2013.01)
G06F 40/134 (2020.01)
G10L 13/04 (2013.01)
G10L 15/14 (2006.01)
G10L 15/16 (2006.01)

(52) U.S. Cl.
CPC ............ *G10L 13/08* (2013.01); *G06F 40/134* (2020.01); *G10L 13/04* (2013.01); *G10L 15/22* (2013.01); *G10L 15/30* (2013.01); *G10L 15/142* (2013.01); *G10L 15/16* (2013.01); *G10L 2015/223* (2013.01)

(58) Field of Classification Search
CPC .......... G10L 13/08; G10L 13/00; G10L 13/04
See application file for complete search history.

(56) References Cited

U.S. PATENT DOCUMENTS

| 5,884,266 | A | * | 3/1999 | Dvorak | H04M 3/493 704/270.1 |
| 5,966,691 | A | * | 10/1999 | Kibre | G10L 13/00 704/260 |
| 5,983,184 | A | * | 11/1999 | Noguchi | G09B 21/006 704/270 |
| 6,018,710 | A | * | 1/2000 | Wynblatt | G06F 3/16 704/243 |
| 6,085,161 | A | * | 7/2000 | MacKenty | G10L 13/00 704/258 |
| 6,115,686 | A | * | 9/2000 | Chung | G10L 13/08 704/260 |
| 6,286,014 | B1 | * | 9/2001 | Fukushima | G06F 17/30014 |

(Continued)

Primary Examiner — Samuel G Neway
(74) Attorney, Agent, or Firm — Pierce Atwood LLP

(57) ABSTRACT

A speech processing system configured to convey linked content to a user in a voice user interface (VUI) environment is described. The system may create output audio data that includes an audible indicator (e.g., a beep) that indicates to a user linked content. An audible indicator may be located at the beginning and/or end of linked content in the output audio data. The system may also output non-linked content in a first voice while outputting linked content in a second voice. The system may further overlay audio atop the linked portion of the output audio data, with the overlaid audio indicating the linked content to the user. A user may invoke linked content in output audio by speaking the linked content, or a portion thereof, back to the system. The system may then output the linked, additional content to the user.

26 Claims, 17 Drawing Sheets

(56) References Cited

U.S. PATENT DOCUMENTS

| | | | | |
|---|---|---|---|---|
| 6,604,076 | B1* | 8/2003 | Holley | G06F 17/30899 |
| | | | | 704/235 |
| 7,228,495 | B2* | 6/2007 | Adapathya | G06F 17/30905 |
| | | | | 707/E17.121 |
| 8,484,028 | B2* | 7/2013 | Carter | G10L 13/00 |
| | | | | 704/258 |
| 8,856,007 | B1* | 10/2014 | Stuttle | G06F 17/30899 |
| | | | | 704/258 |
| 9,495,129 | B2* | 11/2016 | Fleizach | G06F 17/30014 |
| 2003/0028379 | A1* | 2/2003 | Wendt | G10L 13/00 |
| | | | | 704/260 |
| 2005/0065795 | A1* | 3/2005 | Mutsuno | G10L 13/033 |
| | | | | 704/260 |
| 2006/0224386 | A1* | 10/2006 | Ikegami | G10L 13/00 |
| | | | | 704/260 |
| 2009/0326953 | A1* | 12/2009 | Peralta Gimenez | G10L 15/26 |
| | | | | 704/270.1 |
| 2011/0295606 | A1* | 12/2011 | Ben-Ezri | G10L 13/08 |
| | | | | 704/260 |
| 2018/0190275 | A1* | 7/2018 | Bhaya | G10L 15/22 |

* cited by examiner

TEXT

<TEXT>

TEXT

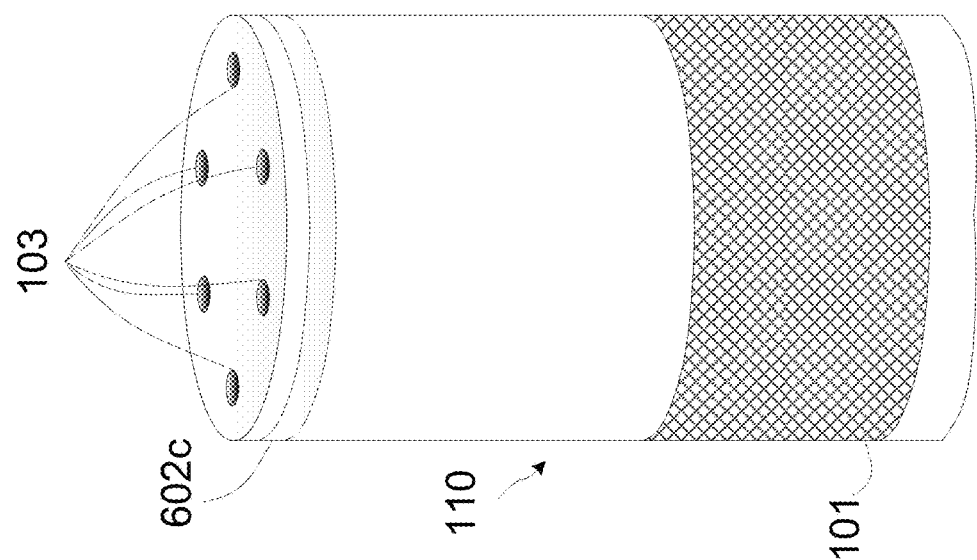
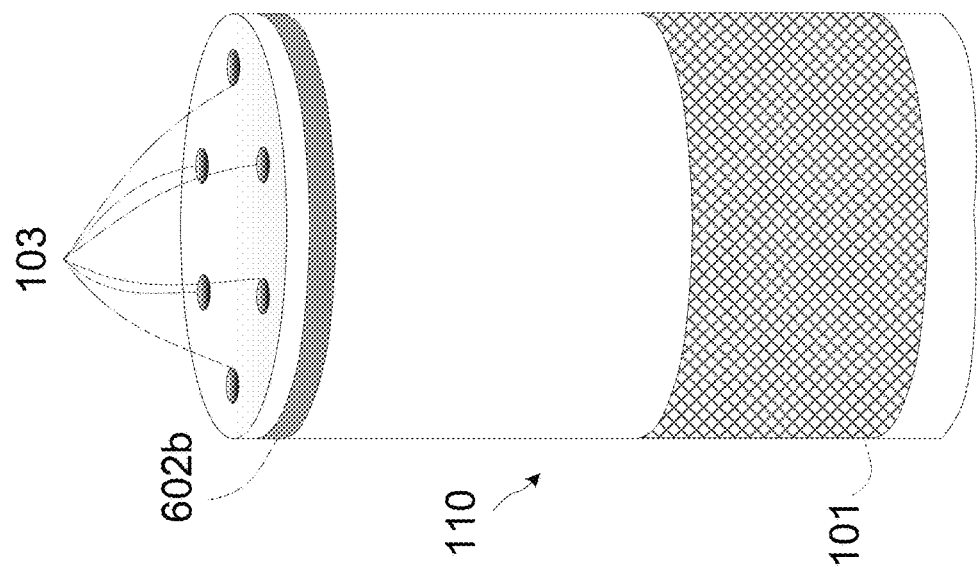
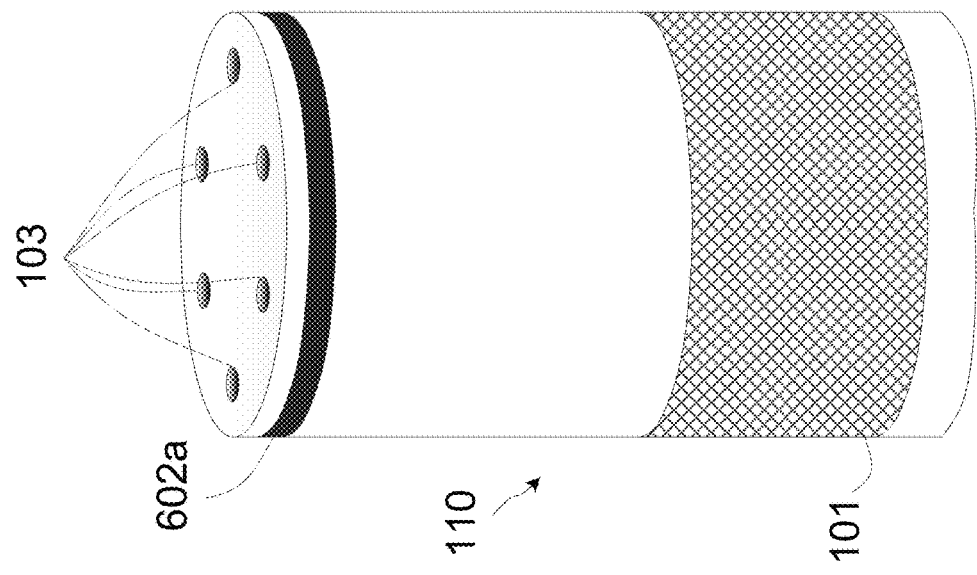

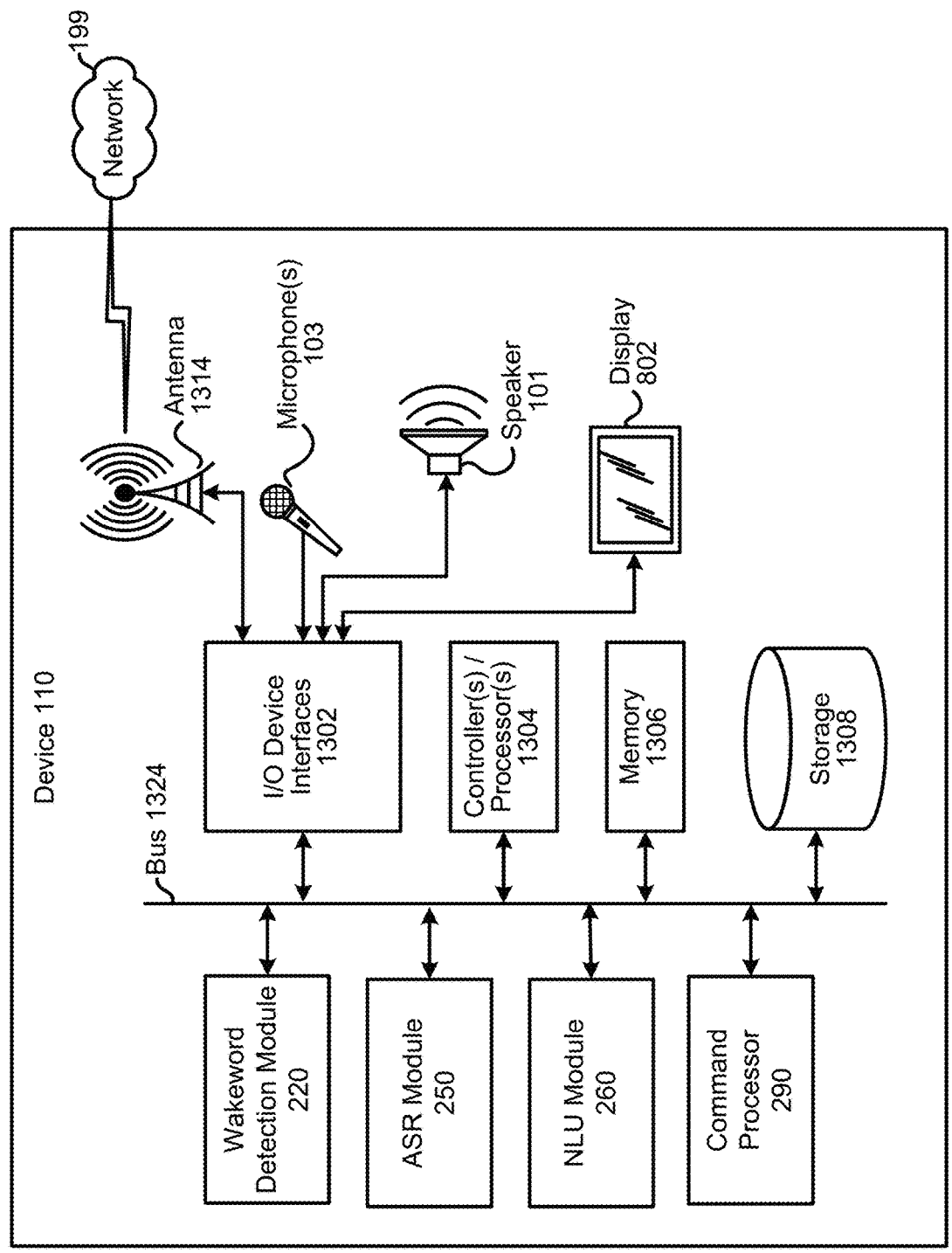

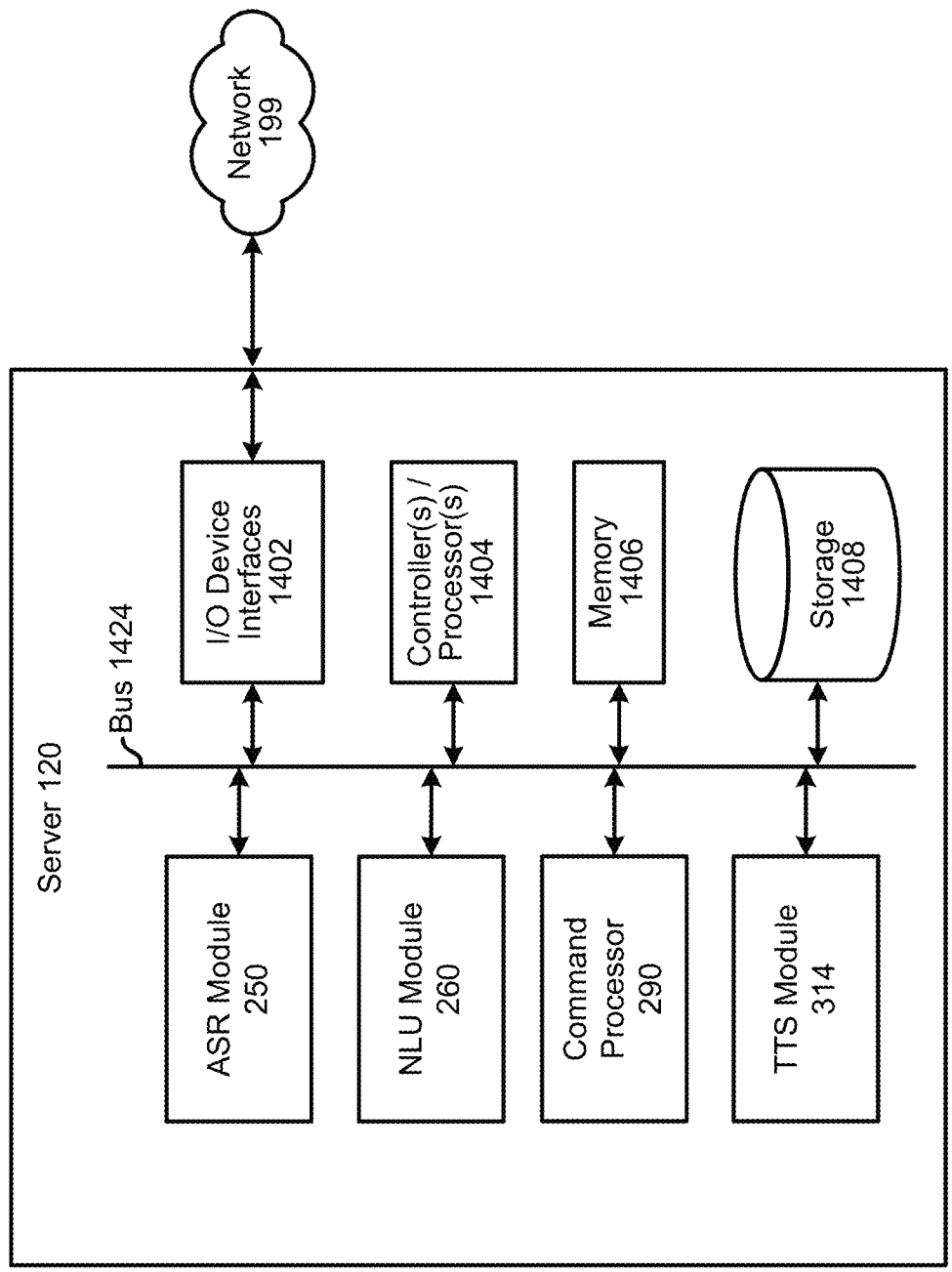

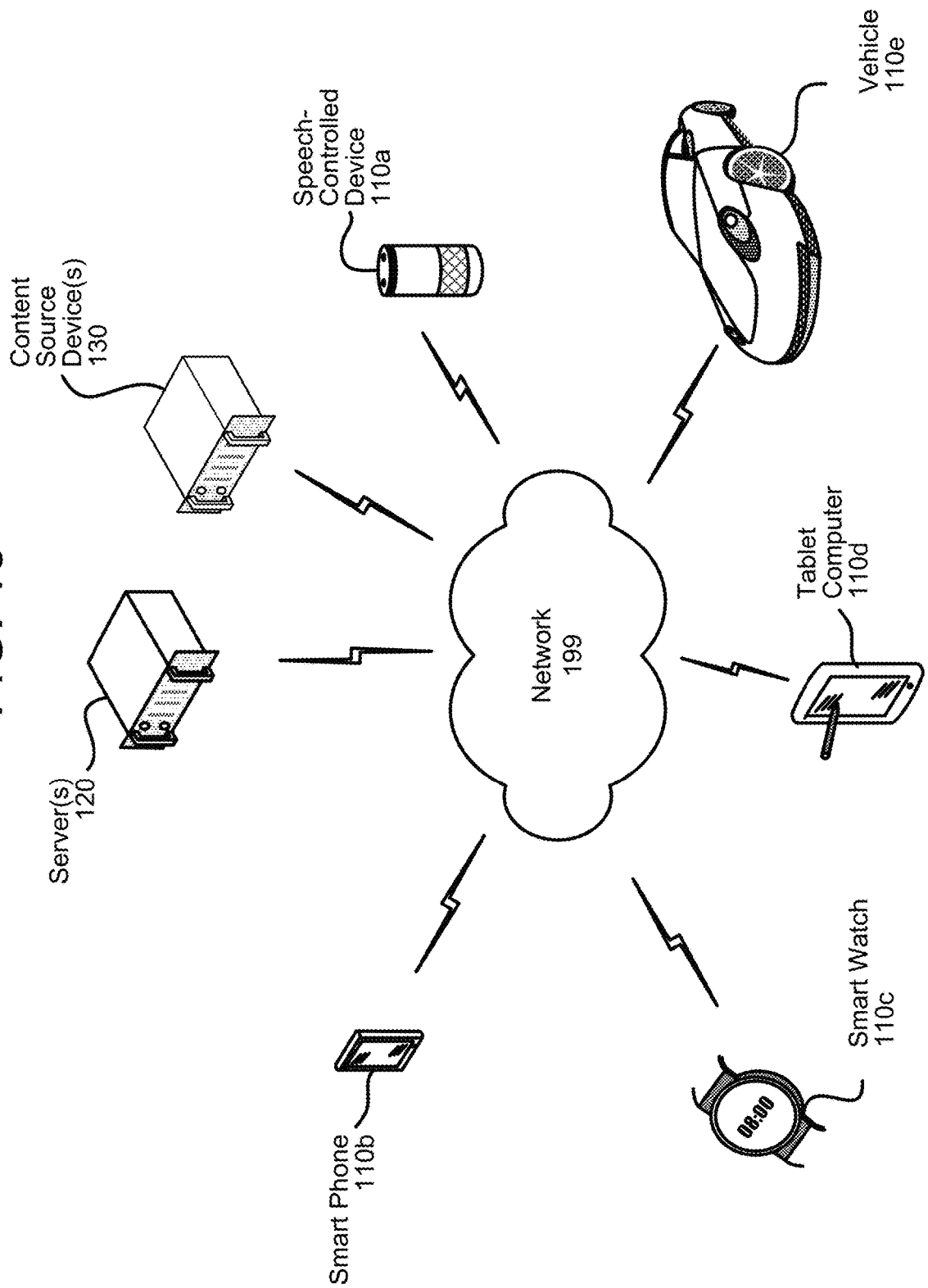

LINKED CONTENT IN VOICE USER INTERFACE

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 6A through 6C illustrate how a speech-controlled device may visually indicate the output of audio linked to additional content according to embodiments of the present disclosure.

FIG. 13 is a block diagram conceptually illustrating example components of a device according to embodiments of the present disclosure.

FIG. 14 is a block diagram conceptually illustrating example components of a server according to embodiments of the present disclosure.

FIG. 15 illustrates an example of a computer network for use with the system.

DETAILED DESCRIPTION

Figure 1:
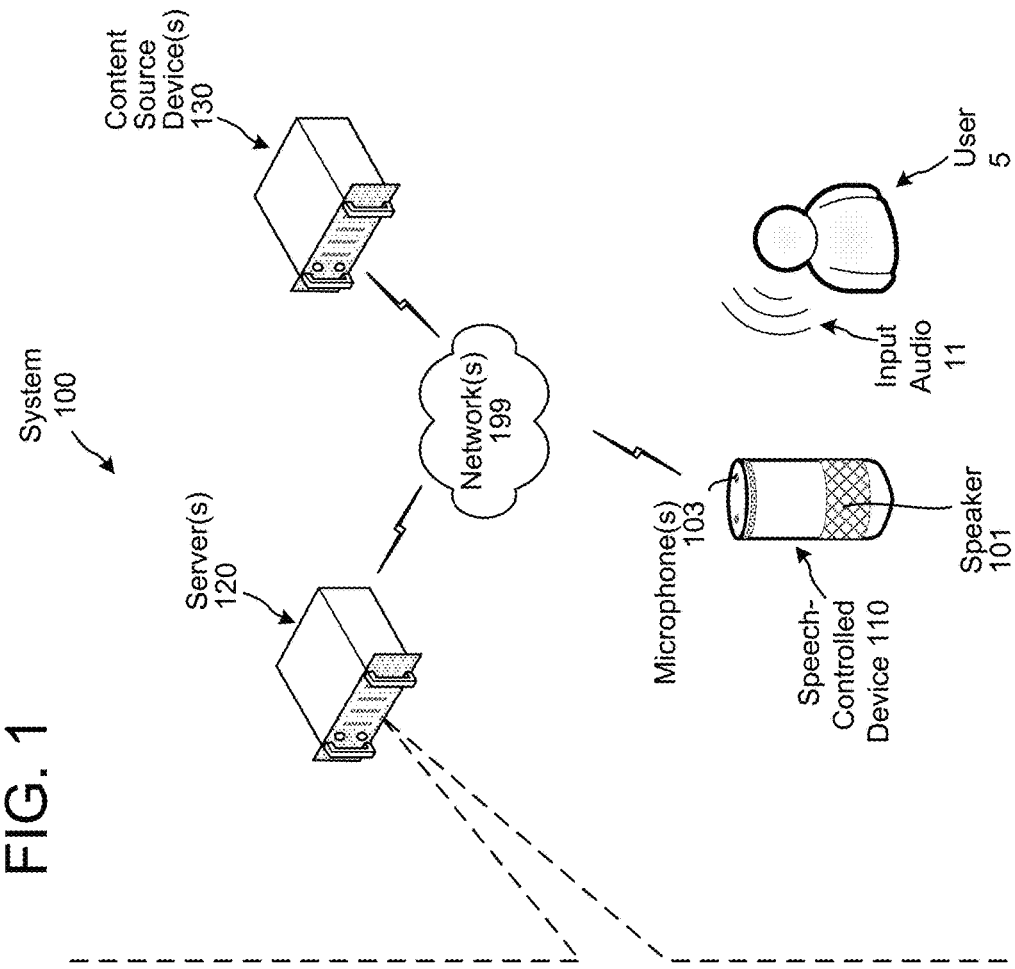
FIG. 1 illustrates a speech processing system for navigating linked content in a voice user interface (VUI) according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

A user of a device may read content on a display of the device. Sometimes, the content may include text that is linked to other content by a uniform resource locator (URL) link. The linked text may be visually displayed to the user in various forms. For example, the linked text may be a different color from non-linked text, the linked text may be underlined while non-linked text is not underlined, the linked text may be bolded while the non-linked text is not bolded, etc.

Various devices may audibly provide content to a user, as well as conduct conversations with a user. For example, a user may request that content be output in a spoken form, and the device may audibly output the content using TTS processes. For example, the user may request a device provide a news report, answer to a query, or other information. To respond to the user's request a system may obtain data responsive to the query and synthesize TTS output for playback to the user. The content data obtained by the system in response to the request may originate as text data that is converted into audio data prior to output to the user. In some instances, the text data may include a link to other content. If such a link were included in a visual display, the text could be altered to show that it corresponds to a link (such as through underlining, a color change, boldface, or the like). For purposes of output through an audio interface, however, the device and/or system may not be capable of providing a visual indication of the link. For example, certain speech processing devices may be headless (i.e., they may not include displays capable of visually outputting content to a user). Thus, for speech processing devices, traditional ways of indicating linked content (i.e., by manipulating the visual appearance of linked content) is undesirable.

The present disclosure provides a speech processing system configured to convey linked content to a user in a voice user interface (VUI) environment. The speech processing system may create output audio data that includes an audible indicator, such as a beep or other sound, that indicates to a user linked content. A beep may be located at the beginning of linked content in the output audio data. Another beep may be located at the end of the linked content in the output audio data. Non-speech audible indicators other than beeps are also envisioned. For example, the speech processing system may output non-linked content in a first synthesized voice profile while outputting linked content in a second synthesized voice profile. The individual different voice profiles may correspond to different voice corpuses for unit selection (explained below) or different vocoder settings for parametric synthesis (explained below). In another example, the speech processing system may overlay audio atop the linked portion of the output audio data. The overlaid audio may be various non-speech sounds, thus providing background noise (such as a hum or other sound) behind synthesized speech corresponding to linked content. Other implementations are also possible. A user may invoke linked content in output audio by speaking a word associated with the linked content, or a portion thereof, back to the system. The command may be interpreted using ASR/NLU techniques, the system may obtain the invoked linked content and the system may then output the invoked linked content to the user.

The presently disclosed system may also indicated linked content using visual indicators. While a device of the system may include a display, thus may be able to display typical visual indicators of links (e.g., underlining, boldfacing, or altering the visual appearance of linked text), a device of the system may also be able to display different visual indicators of links. For example, visual indicators of the present disclosure may be visual indicators may by output components that do not include a display screen. For example, an LED or other component may flash, change color or perform other visual indications to indicate to a user that words being spoken by a VUI at the time of the visual indications correspond to linked content. In another example, if a device includes a screen, an icon may be displayed indicating to a user that content being output as audio while the icon is display is linked to additional content.

FIG. 1 shows a speech processing system 100 that conveys linked content to a user in a VUI environment. Although the figures and discussion illustrate certain operational steps of the system 100 in a particular order, the steps described may be performed in a different order (as well as certain steps removed or added) without departing from the intent of the disclosure. As shown in FIG. 1, the system 100 may include one or more speech-controlled devices 110 local to a user 5, as well as one or more networks 199 and one or more servers 120 connected to the speech-controlled device(s) 110 across the network(s) 199. The system 100 may also include one or more content source devices 130 (e.g., content sources servers) connected to the server(s) 120 of the speech processing system across the network(s) 199. The server(s) 120 (which may be one or more different physical devices) may be capable of performing traditional speech processing (e.g., ASR, NLU, command processing, etc.) as described herein. A single server 120 may perform all speech processing or multiple servers 120 may combine to perform all speech processing. Further, the server(s) 120 may execute certain commands, such as answering spoken utterances of the user 5. In addition, certain speech detection or command execution functions may be performed by the speech-controlled device 110.

As shown in FIG. 1, the speech-controlled device 110 captures a spoken utterance (i.e., input audio 11) of the user 5 via a microphone 103 of the speech-controlled device 110. The speech-controlled device 110 sends input audio data (corresponding to the input audio 11) to the server(s) 120 for processing. Alternatively, a microphone array (not illustrated), separate from the speech-controlled device 110, may capture the input audio 11. In an example, the microphone array is in direct communication with the speech-controlled device 110 such that when the microphone array captures the input audio 11, the microphone array sends the input audio data to the speech-controlled device 110. The speech-controlled device 110 may then forward the received input audio data to the server(s) 120 for processing. In another example, the microphone array is in indirect communication with the speech-controlled device 110 via a companion application of a mobile computing device, such as a smart phone, tablet, laptop, etc. In this example, when the microphone array captures the input audio 11, the microphone array sends the input audio data to the companion application, which forwards the input audio data to the speech-controlled device 110. The speech-controlled device 110 may then forward the input audio data to the server(s) 120 for processing. In yet another example, the microphone array is in indirect communication with the server(s) 120 via the companion application such that when the microphone array captures the input audio 11, the microphone array sends the input audio data to the companion application, which forwards the input audio data to the server(s) 120 for processing.

The server(s) 120 receives (150), from either the speech-controlled device 110 or a companion application, the input audio data. The server(s) 120 performs (152) speech processing (e.g., ASR and NLU) on the input audio data to determine the spoken utterance corresponds to a request or command for content to be output. The server(s) 120 may also determine (154) a content source storing or having access to the content. The server(s) sends (156) a signal to a device of the content source (i.e., the content source device(s) 130) requesting the content. In response, the server(s) 120 receives (158) text data and/or metadata corresponding to the content. In another implementation, rather than receive the text data from the content source device(s) 130 in response to receiving the command from the user, the server(s) 120 may receive and store the text data prior to receiving the command. That is, the server(s) 120 may store the text data in a content library so a content source device(s) 130 does not need to be solicited each time a request for the content is received by the server(s) 120.

The server(s) 120 may process (160) the text data and/or metadata (e.g., using TTS and/or other processes) to determine portions of the text data linked to additional content. Such processing may involve analyzing the text data to determine portions of the text data that are bolded, underlined, etc. to indicated linkages of content. Such processing may also involve analyzing metadata received with the text data to determine portions of the text data linked to other content.

The server(s) 120 may create (162) output audio data including portions (or overlaid with portions) that indicate to a user the portions are linked to additional content. For example, the server(s) 120 may crate the output audio data to include a non-speech audible indicator (e.g., a beep) located at a beginning of each portion of output audio data corresponding to text data linked to additional content. In another example, the server(s) 120 may create the output audio data to include a non-speech audible indicator located at the beginning and end of each portion of output audio data corresponding to text data linked to additional content. In a further example, the server(s) 120 may create the output audio data to include unique voices (e.g., non-linked output audio data may be speech synthesized using a first voice profile and linked output audio data may be speech synthesized using a second voice profile). In an additional example, the server(s) 120 create the output audio data to include speech corresponding to the text data, as well as non-speech audio data overlaid atop each portion of the speech corresponding to text data linked to additional content. The overlaid audio data may be various non-speech sounds.

The server(s) 120 sends (164) the output audio data to the speech-controlled device 110 for output to the user. The server(s) 120 may alternatively send the output audio data to a user device different from the speech-controlled device 110, but indicated in the same user profile as discussed herein.

Figure 2:
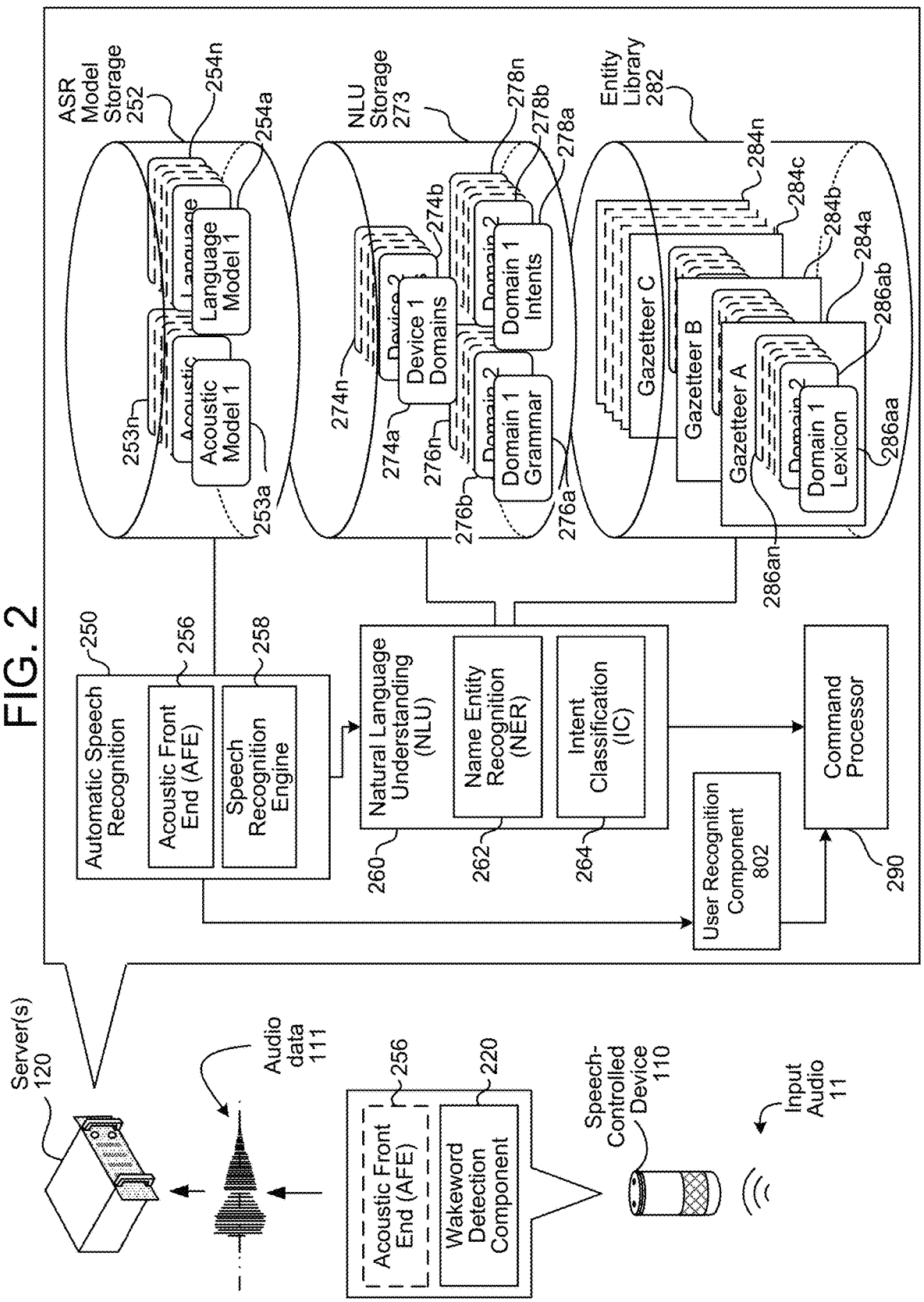
FIG. 2 is a conceptual diagram of how a spoken utterance may be processed according to embodiments of the present disclosure.

Further details of the system 100 that conveys linked content to a user in a VUI environment are explained below, following a discussion of the overall speech processing system of FIG. 2. FIG. 2 is a conceptual diagram of how a spoken utterance is processed. The various components illustrated may be located on a same or different physical devices. Communication between various components illustrated in FIG. 2 may occur directly or across a network(s) 199. An audio capture component, such as the microphone 103 of the speech-controlled device 110 (or other device), captures input audio 11 corresponding to a spoken utterance. The device 110, using a wakeword detection component 220, then processes the audio, or audio data corresponding to the audio, to determine if a keyword (such as a wakeword) is detected in the audio. Following detection of a wakeword, the device 110 sends audio data 111, corresponding to the input audio 11, to a server(s) 120 that includes an ASR component 250. The audio data 111 may be output from an acoustic front end (AFE) 256 located on the speech-controlled device 110 prior to transmission. Alternatively, the audio data 111 may be in a different form for processing by a remote AFE 256, such as the AFE 256 located with the ASR component 250.

The wakeword detection component 220 works in conjunction with other components of the speech-controlled device 110, for example a microphone 103 to detect keywords in audio 11. For example, the speech-controlled device 110 may convert audio 11 into audio data, and process the audio data with the wakeword detection component 220 to determine whether speech is detected, and if so, if the audio data comprising speech matches an audio signature and/or model corresponding to a particular keyword.

The speech-controlled device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the speech-controlled device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the speech-controlled device 110 (or separately from speech detection), the speech-controlled device 110 may use the wakeword detection component 220 to perform wakeword detection to determine when a user intends to speak a command to the speech-controlled device 110. This process may also be referred to as keyword detection, with the wakeword being a specific example of a keyword. Specifically, keyword detection is typically performed without performing linguistic analysis, textual analysis, or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection component 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid DNN-HMM decoding framework. In another embodiment the wakeword spotting system may be built on deep neural network (DNN)/recursive neural network (RNN) structures directly, without MINI involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the speech-controlled device 110 may "wake" and begin transmitting audio data 111 corresponding to input audio 11 to the server(s) 120 for speech processing. The audio data 111 may be sent to the server(s) 120 for routing to a recipient device or may be sent to the server(s) 120 for speech processing for interpretation of the included speech (either for purposes of enabling voice-communications and/or for purposes of executing a command in the speech). The audio data 111 may include data corresponding to the wakeword, or the portion of the audio data 111 corresponding to the wakeword may be removed by the speech-controlled device 110 prior to sending.

Upon receipt by the server(s) 120, an ASR component 250 may convert the audio data 111 into text data. The ASR component 250 transcribes the audio data 111 into text data representing words of speech contained in the audio data 111. The text data may then be used by other components for various purposes, such as executing system commands, inputting data, etc. A spoken utterance in the audio data 111 is input to a processor configured to perform ASR, which then interprets the spoken utterance based on a similarity between the spoken utterance and pre-established language models 254 stored in an ASR model knowledge base (i.e., ASR model storage 252). For example, the ASR component 250 may compare the audio data 111 with models for sounds (e.g., subword units, phonemes, etc.) and sequences of sounds to identify words that match the sequence of sounds spoken in the spoken utterance of the audio data 111.

The different ways a spoken utterance may be interpreted (i.e., the different hypotheses) may each be assigned a probability or a confidence score representing a likelihood that a particular set of words matches those spoken in the spoken utterance. The confidence score may be based on a number of factors including, for example, a similarity of the sound in the spoken utterance to models for language sounds (e.g., an acoustic model 253 stored in the ASR model storage 252), and a likelihood that a particular word that matches the sound would be included in the sentence at the specific location (e.g., using a language model 254 stored in the ASR model storage 252). Thus, each potential textual interpretation of the spoken utterance (i.e., hypothesis) is associated with a confidence score. Based on the considered factors and the assigned confidence score, the ASR component 250 outputs the most likely text recognized in the audio data 111. The ASR component 250 may also output multiple hypotheses in the form of a lattice or an N-best list with each hypothesis corresponding to a confidence score or other score (e.g., such as probability scores, etc.).

The device or devices including the ASR component 250 may include an AFE 256 and a speech recognition engine 258. The AFE 256 transforms the audio data 111 into data for processing by the speech recognition engine 258. The speech recognition engine 258 compares the speech recognition data with acoustic models 253, language models 254, and other data models and information for recognizing the speech conveyed in the audio data 111. The AFE 256 may reduce noise in the audio data 111 and divide the digitized audio data 111 into frames representing time intervals for which the AFE 256 determines a number of values (i.e., features) representing qualities of the audio data 111, along with a set of those values (i.e., a feature vector or audio feature vector) representing features/qualities of the audio data 111 within each frame. Many different features may be determined, as known in the art, and each feature represents some quality of the audio that may be useful for ASR processing. A number of approaches may be used by the AFE 256 to process the audio data 111, such as mel-frequency cepstral coefficients (MFCCs), perceptual linear predictive (PLP) techniques, neural network feature vector techniques, linear discriminant analysis, semi-tied covariance matrices, or other approaches known to those skilled in the art.

The speech recognition engine 258 may process data output from the AFE 256 with reference to information stored in the ASR model storage 252. Alternatively, post front-end processed data (e.g., feature vectors) may be received by the device executing ASR processing from another source besides the internal AFE 256. For example, the speech-controlled device 110 may process audio data 111 into feature vectors (e.g., using an on-device AFE 256) and transmit that information to the server(s) 120 across the network(s) 199 for ASR processing. Feature vectors may arrive at the server(s) 120 encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving a likelihood that the ASR component 250 will output speech results that make sense grammatically.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as the server 120, for natural language understanding (NLU) processing, such as conversion of the text data into commands for execution, either by the speech-controlled device 110, by the server(s) 120, or by another device (e.g., a server running a search engine, etc.)

The device performing NLU processing (e.g., the server(s) 120) may include various components, including potentially dedicated processor(s), memory, storage, etc. The device performing NLU processing may include a dedicated NLU component/component 260, which may include a named entity recognition (NER) component 262, and intent classification (IC) component 264. The device performing NLU processing may additionally include NLU storage 273, and a knowledge base (not illustrated). The knowledge base is a database or other information storage that may include information about entities that may be used in resolving spoken utterances. The NLU component 260 may also utilize gazetteer information 284a-284n stored in an entity library storage 282. The knowledge base and/or gazetteer information 284a-284n may be used for entity resolution, for example matching ASR results with different entities (e.g., song titles, contact names, etc.). Gazetteers 284a-284n may be linked to users (e.g., a particular gazetteer may be associated with a specific user's music collection), may be linked to certain domains (e.g., shopping), or may be organized in a variety of other ways.

The NLU component 260 takes text data (e.g., output from the ASR component 250 based on the spoken utterance/input audio 11) and attempts to make a semantic interpretation of the text data. That is, the NLU component 260 determines the meaning behind the text data based on the individual words and then implements that meaning. The NLU component 260 interprets a text string to derive an intent or a desired action from the user as well as the pertinent pieces of information in the text data that allow a device (e.g., the speech-controlled device 110, the server(s) 120, etc.) to complete that action. For example, if a spoken utterance is processed using the ASR component 250, which outputs the text data "call mom", the NLU component 260 may determine the user intended to activate a telephone in his/her device and to initiate a call with a contact matching the entity "mom."

The NLU component 260 may process several textual inputs related to the same utterance. For example, if the ASR component 250 outputs N text segments (e.g., as part of an N-best list), the NLU component 260 may process all N outputs to obtain NLU results.

As will be discussed further below, the NLU component 260 may be configured to parse and tag to annotate text data as part of NLU processing. For example, for the text data "call mom," "call" may be tagged as a command (e.g., to execute a phone call) and "mom" may be tagged as a specific entity and target of the command. In addition, the telephone number for the entity corresponding to "mom" stored in a contact list may be included in the annotated NLU results.

To correctly perform NLU processing of speech input, the NLU component 260 may be configured to determine a "domain" of the utterance so as to determine and narrow down which services offered by an endpoint device (e.g., the server(s) 120, or the speech-controlled device 110) may be relevant. For example, an endpoint device may offer services relating to interactions with a telephone service, a contact list service, a calendar/scheduling service, a music player service, etc. Words in text data may implicate more than one service, and some services may be functionally linked (e.g., both a telephone service and a calendar service may utilize data from the contact list).

The NER component 262 receives an utterance in the form of ASR results and attempts to identify relevant grammars and lexical information that may be used to construe meaning. To do so, the NER component 262 may begin by identifying potential domains that may relate to the received utterance. The NLU storage 273 includes a database of domains 274a-274n associated with specific devices. For example, the speech-controlled device 110 may be associated with domains for music, telephony, calendaring, contact lists, and device-specific communications, but not video. In addition, the entity library 282 may include database entries about specific services on a specific device, either indexed by Device ID, User ID, Household ID, or some other indicator.

A domain may represent a discrete set of activities having a common theme, such as "shopping", "music", "calendaring", etc. As such, each domain may be associated with a particular language model and/or grammar database 276a-276n, a particular set of intents/actions 278a-278n, and/or a particular personalized lexicon 286. Each gazetteer 284a-284n may include domain-indexed lexical information associated with a particular user and/or device. For example, the Gazetteer A 284a includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

An utterance may be processed applying the rules, models, and information applicable to each identified domain. For example, if an utterance potentially implicates both communications and music, the utterance will be NLU processed using the grammar models and lexical information for communications, and will also be processed using the grammar models and lexical information for music. The responses to the spoken utterance produced by each set of models is scored, with the overall highest ranked result from all applied domains being ordinarily selected to be the correct result.

An IC component 264 parses the utterance to determine an intent(s) for each identified domain, where the intent(s) corresponds to the action to be performed that is responsive to the spoken utterance. Each domain is associated with a database 278a-278n of words linked to intents. For example, a music intent database may link words and phrases such as "quiet," "volume off," and "mute" to a "mute" intent. The IC component 264 identifies potential intents for each identified domain by comparing words in the utterance to the words and phrases in the intents database 278.

In order to generate a particular interpreted response, the NER component 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model 276 associated with a shopping domain may include a database of words commonly used when people discuss shopping.

The intents identified by the IC component 264 are linked to domain-specific grammar frameworks (included in 276) with "slots" or "fields" to be filled. For example, if "play music" is an identified intent, a grammar 276 framework(s) may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER component 262 may parse the spoken utterance to identify words as subject, object, verb, preposition, etc., based on grammar rules and models, prior to recognizing named entities. The identified verb may be used by the IC component 264 to identify intent, which is then used by the NER component 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER component 262 then searches the corresponding fields in the domain-specific and personalized lexicon(s), attempting to match words and phrases in the utterance tagged as a grammatical object or object modifier with those identified in the database(s).

This process includes semantic tagging, which is the labeling of a word or combination of words according to their type/semantic meaning. Parsing may be performed using heuristic grammar rules, or the NER component 262 may be constructed using techniques such as HMMs, maximum entropy models, log linear models, conditional random fields (CRF), and the like.

For instance, an utterance of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC component 264 will determine corresponds to the "play music" intent. No determination has been made as to the meaning of "mother's little helper" and "the rolling stones," but based on grammar rules and models, it is determined that these phrases relate to the grammatical object of the spoken utterance.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER component 262 may search the database of generic words associated with the domain (i.e., in the NLU storage 273). For instance, if the utterance was "play songs by the rolling stones," after failing to determine an album name or song name called "songs" by "the rolling stones," the NER component 262 may search the domain vocabulary for the word "songs." In the alternative, generic words may be checked before the gazetteer information, or both may be tried, potentially producing two different results.

The comparison process used by the NER component 262 may classify (i.e., score) how closely a database entry compares to a tagged utterance word or phrase, how closely the grammatical structure of the utterance corresponds to the applied grammatical framework, and based on whether the database indicates a relationship between an entry and information identified to fill other slots of the framework.

The NER component 262 may also use contextual operational rules to fill slots. For example, if a user had previously requested to pause a particular song and thereafter requested that the speech-controlled device 110 "please un-pause my music," the NER component 262 may apply an inference-based rule to fill a slot associated with the name of the song that the user currently wishes to play—namely the song that was playing at the time the user requested to pause the music.

The results of NLU processing may be tagged to attribute meaning to the utterance. So, for example, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing, which may include tagged text data, commands, etc., may then be sent to a command processor 290, which may be located on a same or separate server(s) 120 as part of the system 100. The system 100 may include more than one command processor 290, and the command processor(s) 290 may be determined based on the NLU output. For example, if the NLU output includes a command to play music, the command processor(s) 290 selected may be a music playing application, such as one located on the speech-controlled device 110 or in a music playing appliance, configured to execute a music playing command. If the NLU output includes a search utterance (e.g., requesting the return of search results), the command processor(s) 290 selected may include a search engine processor, such as one located on a search server, configured to execute a search command and determine search results, which may include output text data to be processed by a TTS engine and output from a device as synthesized speech.

Further, the ASR component 250 may output ASR confidence score data for further processing by a user recognition component 295. The user recognition component 295 performs processes to identify a user (i.e., determine an identity of a user) as well as verify the user (i.e., confirm that the identified user is correct). The user recognition component 295 performs user recognition using the audio data 111, and optionally the ASR component output. The user recognition component 295 may include a scoring component that determines respective scores indicating whether the input utterance in the audio data 111 was spoken by particular users. The user recognition component 295 may also include a confidence component that determines an overall confidence as the accuracy of user recognition operations. Output of the user recognition component 295 may be provided to the command processor 290. The command processor 290 may use the user recognition component output to determine content source devices 130, as well as perform other functions described herein.

Figure 3:
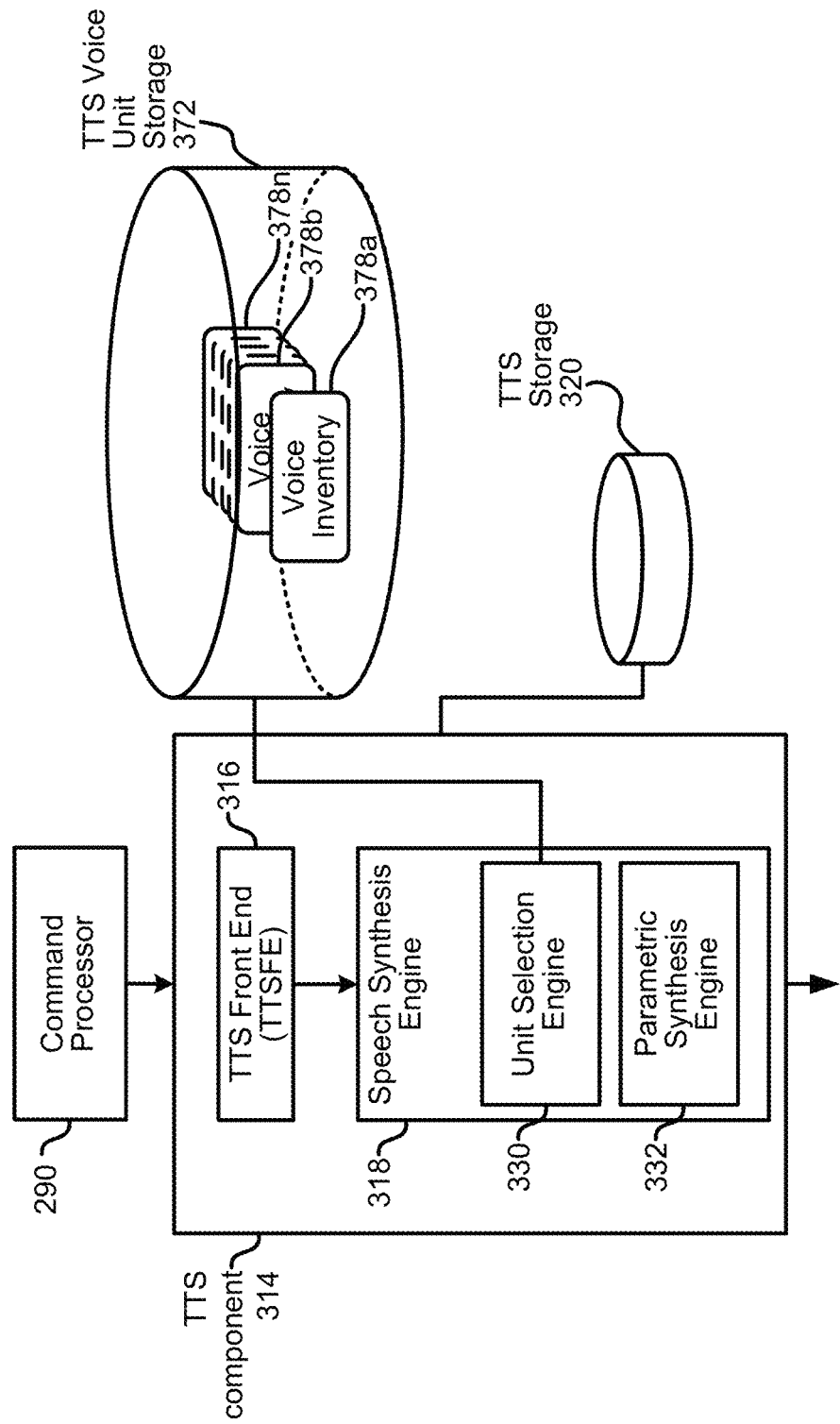
FIG. 3 is a conceptual diagram of how text-to-speech processing is performed according to embodiments of the present disclosure.

A TTS component 314 may receive tagged text data from the command processor(s) 290, so the TTS component 314 may synthesize speech corresponding to the text data. Speech may be synthesized by the TTS component 314 as described below with respect to FIG. 3.

The TTS component 314 includes a TTS front end (TTSFE) 316, a speech synthesis engine 318, and a TTS storage 320. The TTSFE 316 transforms input text data (e.g., from the command processor(s) 290) into a symbolic linguistic representation for processing by the speech synthesis engine 318. The TTSFE 316 may also process tags or other data input to the TTS component 314 that indicate how specific words should be pronounced. The speech synthesis engine 318 compares the annotated phonetic units and information stored in the TTS storage 320 for converting the input text data into speech (i.e., audio data). The TTSFE 316 and the speech synthesis engine 318 may include their own controller(s)/processor(s) and memory, or they may use the controller(s)/processor(s) and memory of the server(s) 120, the speech-controlled device 110, or another device, for example. Similarly, the instructions for operating the TTSFE 316 and the speech synthesis engine 318 may be located within the TTS component 314, within the memory and/or storage of the server(s) 120, the speech-controlled device 110, or within an external device.

Text data input into the TTS component 314 may be sent to the TTSFE 316 for processing. The TTSFE 316 may include components for performing text normalization, linguistic analysis, and linguistic prosody generation. During text normalization, the TTSFE 316 processes the input text data and generates standard/normalized text data, converting such things as numbers, abbreviations (e.g., Apt., St., etc.), and symbols ($, %, etc.) into the equivalent of written out words.

During linguistic analysis the TTSFE 316 analyzes language in the normalized text data to generate a sequence of phonetic units corresponding to the text data. This process may be referred to as phonetic transcription. Phonetic units include symbolic representations of sound units to be eventually combined and output by the system 100 as speech. Various sound units may be used for dividing text data for purposes of speech synthesis. The TTS component 314 may process speech based on phonemes (i.e., individual sounds), half-phonemes, di-phones (i.e., the last half of one phoneme coupled with the first half of an adjacent phoneme), bi-phones (i.e., two consecutive phonemes), syllables, words, phrases, sentences, or other units. Each word may be mapped to one or more phonetic units. Such mapping may be performed using a language dictionary stored by the system 100, for example in the TTS storage 320. The linguistic analysis performed by the TTSFE 316 may also identify different grammatical components such as prefixes, suffixes, phrases, punctuation, syntactic boundaries, or the like. Such grammatical components may be used by the TTS component 314 to craft a natural sounding audio waveform output. The language dictionary may also include letter-to-sound rules and other tools that may be used to pronounce previously unidentified words or letter combinations that may be encountered by the TTS component 314. Generally, the more information included in the language dictionary, the higher quality the speech output.

Based on the linguistic analysis, the TTSFE 316 may then perform linguistic prosody generation where the phonetic units are annotated with desired prosodic characteristics, also called acoustic features, which indicate how the desired phonetic units are to be pronounced in the eventual output speech. During this stage, the TTSFE 316 may consider and incorporate any prosodic annotations that accompanied the text data input to the TTS component 314. Such acoustic features may include pitch, energy, duration, and the like. Application of acoustic features may be based on prosodic models available to the TTS component 314. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information.

The output of the TTSFE 316, referred to as a symbolic linguistic representation, may include a sequence of phonetic units annotated with prosodic characteristics. This symbolic linguistic representation may be sent to the speech synthesis engine 318, also known as a synthesizer, for conversion into an audio waveform of speech for output to an audio output device and eventually to a user. The speech synthesis engine 318 may be configured to convert the input text data into high-quality natural-sounding speech in an efficient manner. Such high-quality speech may be configured to sound as much like a human speaker as possible, or may be configured to be understandable to a listener without attempts to mimic a precise human voice.

The speech synthesis engine 318 may perform speech synthesis using one or more different methods. In one method of synthesis called unit selection, described further below, a unit selection engine 330 matches the symbolic linguistic representation created by the TTSFE 316 against a database of recorded speech, such as a database of a voice corpus. The unit selection engine 330 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (e.g., its pitch, energy, etc.), as well as other information, such as where the phonetic unit appears in a word, sentence, or phrase, neighboring phonetic units, etc. Using all the information in the unit database, the unit selection engine 330 may match units to the input text data to create a natural sounding waveform. The unit database may include multiple examples of phonetic units to provide the system 100 with many different options for concatenating units into speech. One benefit of unit selection is that, depending on the size of the database, a natural sounding speech output may be generated. As described above, the larger the unit database of the voice corpus, the more likely the system 100 will be able to construct natural sounding speech.

In another method of synthesis, called parametric synthesis, parameters such as frequency, volume, and noise are varied by a parametric synthesis engine 332, a digital signal processor, or other audio generation device to create an artificial speech waveform output. Parametric synthesis uses a computerized voice generator, sometimes called a vocoder.

Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio data output.

Parametric speech synthesis may be performed as follows. The TTS component 314 may include an acoustic model, or other models, which may convert a symbolic linguistic representation into a synthetic acoustic waveform of the input text data based on audio signal manipulation. The acoustic model includes rules which may be used by the parametric synthesis engine 332 to assign specific audio waveform parameters to input phonetic units and/or prosodic annotations. The rules may be used to calculate a score representing a likelihood that a particular audio output parameter(s) (e.g., frequency, volume, etc.) corresponds to the portion of the input symbolic linguistic representation received from the TTSFE 316.

The parametric synthesis engine 332 may use a number of techniques to match speech to be synthesized with input phonetic units and/or prosodic annotations. One common technique is using HMMs. HMMs may be used to determine probabilities that audio output should match textual input. HMMs may be used to translate from parameters from the linguistic and acoustic space to the parameters to be used by a vocoder (i.e., the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text data. Each portion of text data may be represented by multiple potential states corresponding to different known pronunciations of phonemes and their parts (e.g., phoneme identity, stress, accent, position, etc.). An initial determination of a probability of a potential phoneme may be associated with one state. As new text data is processed by the speech synthesis engine 318, the state may change or stay the same, based on processing of the new text data. For example, the pronunciation of a previously processed word might change based on later processed words. A Viterbi algorithm may be used to find the most likely sequence of states based on the processed text data. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, harmonic plus noise (HNM) based vocoders, code-excited linear prediction (CELP) vocoders, GlottHMM vocoders, harmonic/stochastic model (HSM) vocoders, or others.

For example, to create the customized speech output of the system 100, the system 100 may be configured with multiple voice profile inventories (also called voice corpuses) 378a-378n (stored in TTS voice unit storage 372), where each unit database for a particular voice profile is configured with a different "voice" (e.g., different unit libraries that when used to synthesize speech sound different from each other). Such voice inventories and/or voice profiles may also be linked to user accounts, discussed below. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual and recorded by the system 100. The TTS training utterances used to train a TTS voice corpus may be different from the training utterances used to train an ASR system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match a desired speech quality. The customized voice inventory 378 may then be used during runtime to perform unit selection to synthesize speech. Similarly, for parametric synthesis different voice profiles may be associated with different vocoder settings, such that when vocoder settings of one voice profile are used to synthesize speech, the resulting speech sounds different from speech synthesized using the vocoder settings of a different voice profile.

As an alternative to customized voice corpuses or customized parametric "voices," one or more filters may be used to alter traditional TTS output to match a desired speech quality (e.g., whisper, shout, etc.). For example, the TTS component 314 may synthesize speech as normal, but the system 100, either as part of the TTS component 314 or otherwise, may apply a filter to make the synthesized speech take on the desired speech quality. In this manner a traditional TTS output may be altered to take on the desired speech quality.

During runtime the TTS component 314 may receive text data for speech synthesis along with an indicator for a desired speech quality of the output speech. The TTS component 314 may then select a voice matching the speech quality, either for unit selection or parametric synthesis, and synthesize speech using the received text data and speech quality indicator.

The TTS component 314 may create audio data including more than one voice from a single set of text data. For example, a first voice may be used to convey to a user non-linked speech (i.e., speech corresponding to non-linked text data), and a second voice may be used to convey to a user linked speech (i.e., speech corresponding to text data). Each voice may be created from or using a different speech unit corpus.

Figure 4:
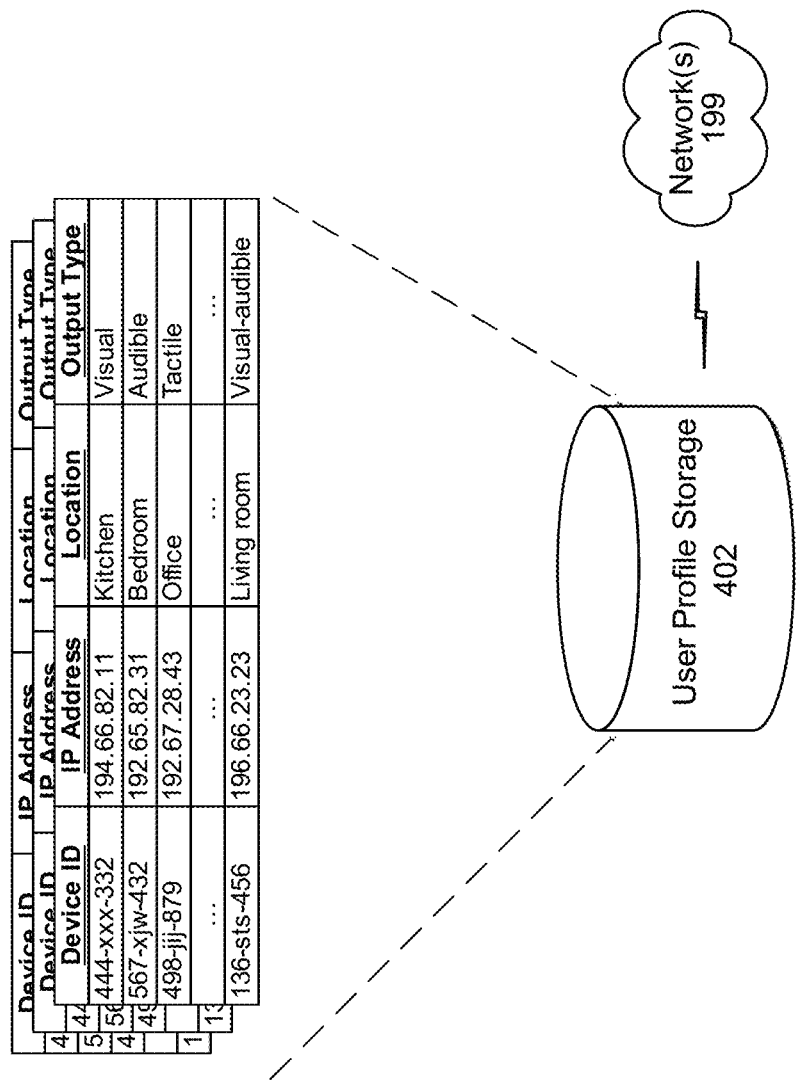
FIG. 4 illustrates data stored and associated with user profiles according to embodiments of the present disclosure.

FIG. 4 illustrates a user profile storage 402 that includes data regarding user accounts and/or respective devices as described herein. The user profile storage 402 may be located proximate to the server(s) 120, or may otherwise be in communication with various components, for example over the network(s) 199. The profile storage 402 may include a variety of information related to individual users, accounts, devices, etc. that interact with the system 100. In an example, the user profile storage 402 is a cloud-based storage. Each profile may include data such as device identifier (ID) data, internet protocol (IP) address data, location of device data, and output type data. A user profile may also include user settings regarding what voice profiles should be used to perform TTS under what circumstances (e.g., how a user prefers to be notified of linked content when using a VUI).

Figures 5A, 5B:
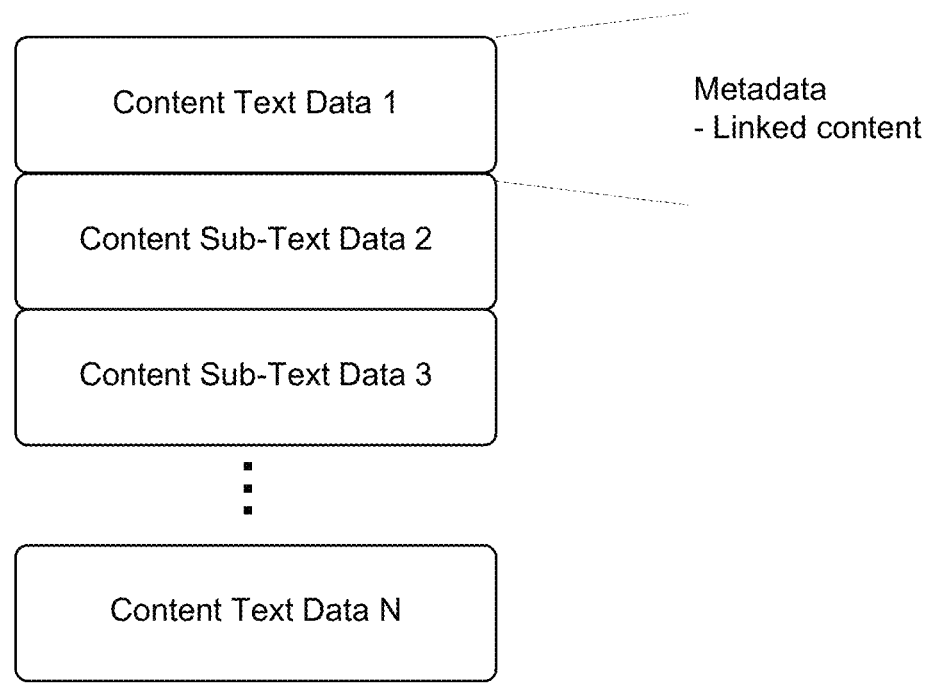
FIGS. 5A through 5B illustrate how linked text may be indicated in text data received by a speech processing system according to embodiments of the present disclosure.

The server(s) 120 may receive text data from various content source devices 130. Each portion of text data may include text not linked to additional content (e.g., regular text data), as well as text linked to additional content (e.g., linked text data). Text may be linked to additional content by a uniform resource locator (URL) link associated with the linked text. Text may be indicated as linked to additional content within the text data. FIG. 5A illustrates ways in which text may be indicated as linked to additional content. Non-linked text may be non-emphasized, and linked text may be emphasized by, for example, underlining, bracketing, bolding, italicizing, combinations thereof, etc. Text data may also include link indicator text such as html or other code indicating a start (e.g., <l>), end (</l>) or location of linked content (e.g., <www.testlink.com>). Text may also or alternatively be indicated as linked to additional content using metadata associated with the text data (as illustrated in FIG. 5B). For example, the metadata may indicate each portion of text linked to additional content, a location of the text in the text data (e.g., by line number), as well as data identifying the linked additional content and a source associated therewith.

Even if the ultimate output device may lack a display to show traditional hyperlinked text (e.g., www.amazon.com), the system may still visually indicate content is linked to additional content. Colors and shades of a visual indicator 602 may be configured to change to indicate when linked content is audibly being output by the speech-controlled device 110 (as illustrated in FIGS. 6A through 6C). For example, the visual indicator 602 may be unlit when non-linked audio is being output, the visual indicator 602 may be turned on when the output audio transitions from non-linked audio to linked audio, the visual indicator 602 may remain lit while the linked audio is output, and the visual indicator 602 may be turned off when the output audio transitions from linked audio to non-linked audio.

Figure 7B:
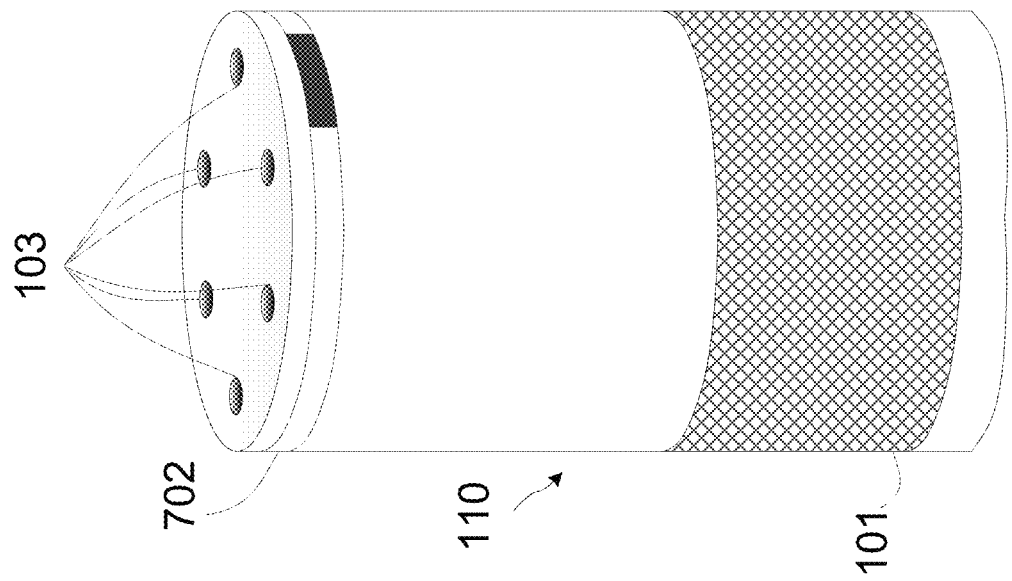
FIGS. 7A through 7B illustrate how a speech-controlled device may visually indicate the output of audio linked to additional content according to embodiments of the present disclosure.
Figure 7A:
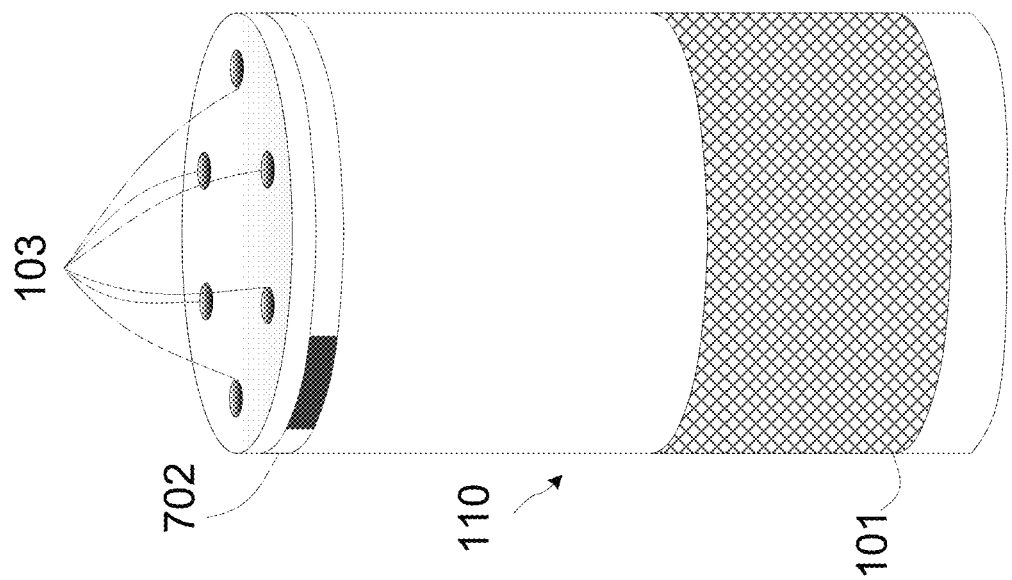

A visual indicator 702 may be configured to appear to move around or along the speech-controlled device 110 to indicate when linked content is being audibly output (as illustrated in FIGS. 7A through 7B). For example, the visual indicator 702 may be unlit when non-linked audio is being output, the visual indicator 702 may be turned on and begin to move on the speech-controlled device 110 when the output audio transitions from non-linked audio to linked audio, the visual indicator 702 may continue to move on the speech-controlled device 110 while the linked audio is output, and the visual indicator 702 may be turned off when the output audio transitions from linked audio to non-linked audio.

Figure 8:
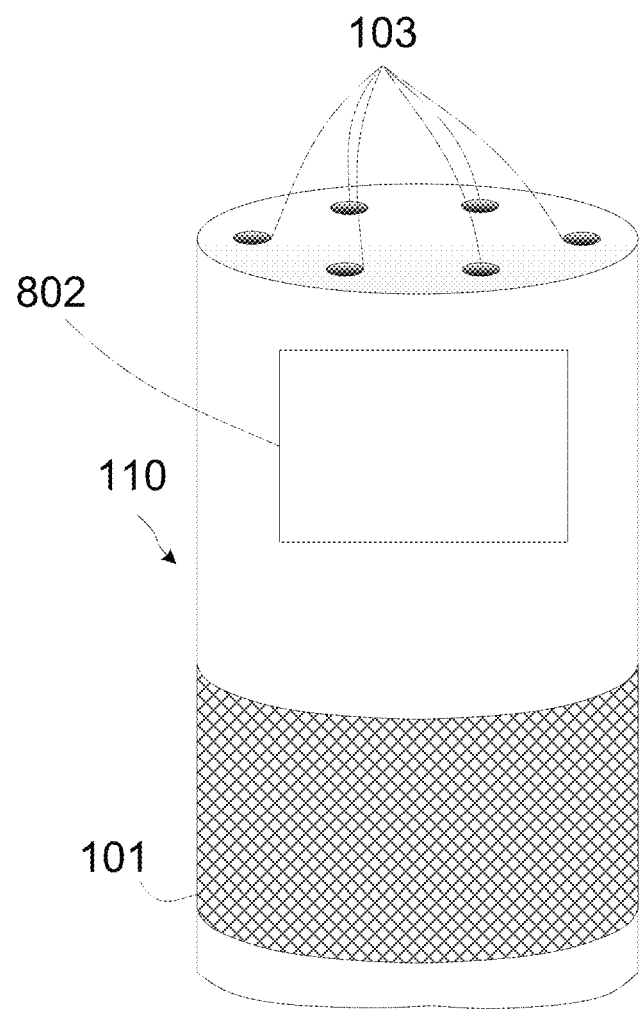
FIG. 8 illustrates how a speech-controlled device may visually indicate the output of audio linked to additional content according to embodiments of the present disclosure.

A display 802, either located on the speech-controlled device (as illustrated in FIG. 8) or located separate from the speech-controlled device (e.g., a display of a smart phone, tablet, television, etc.), may be used to visually indicate that linked audio is being output by the speech-controlled device 110. The visual content displayed to indicate the output of linked audio may be linked content agnostic (i.e., the visual content may be the same regardless of the linked audio). For example, a single graphical element or icon may be used to indicate to a user that linked audio is being output, regardless of the substance of the linked audio or the additional content. Alternatively, the visual content displayed to indicate the output of linked audio may be specific to the linked audio and/or the additional content. For example, if the linked text, from which the linked audio was created, corresponds to "order a pizza," the display may display the text "order a pizza" when speech corresponding to "order a pizza" is audibly output by the speech-controlled device.

The server(s) 120 may send the speech-controlled device 110 metadata or another signal including a time stamp or other data indicating when the speech-controlled device 110 should output the visual indicator. That is, the metadata or other signal may indicate synthesized speech and/or audio that the visual indicator should be output simultaneously with.

Figure 9A:
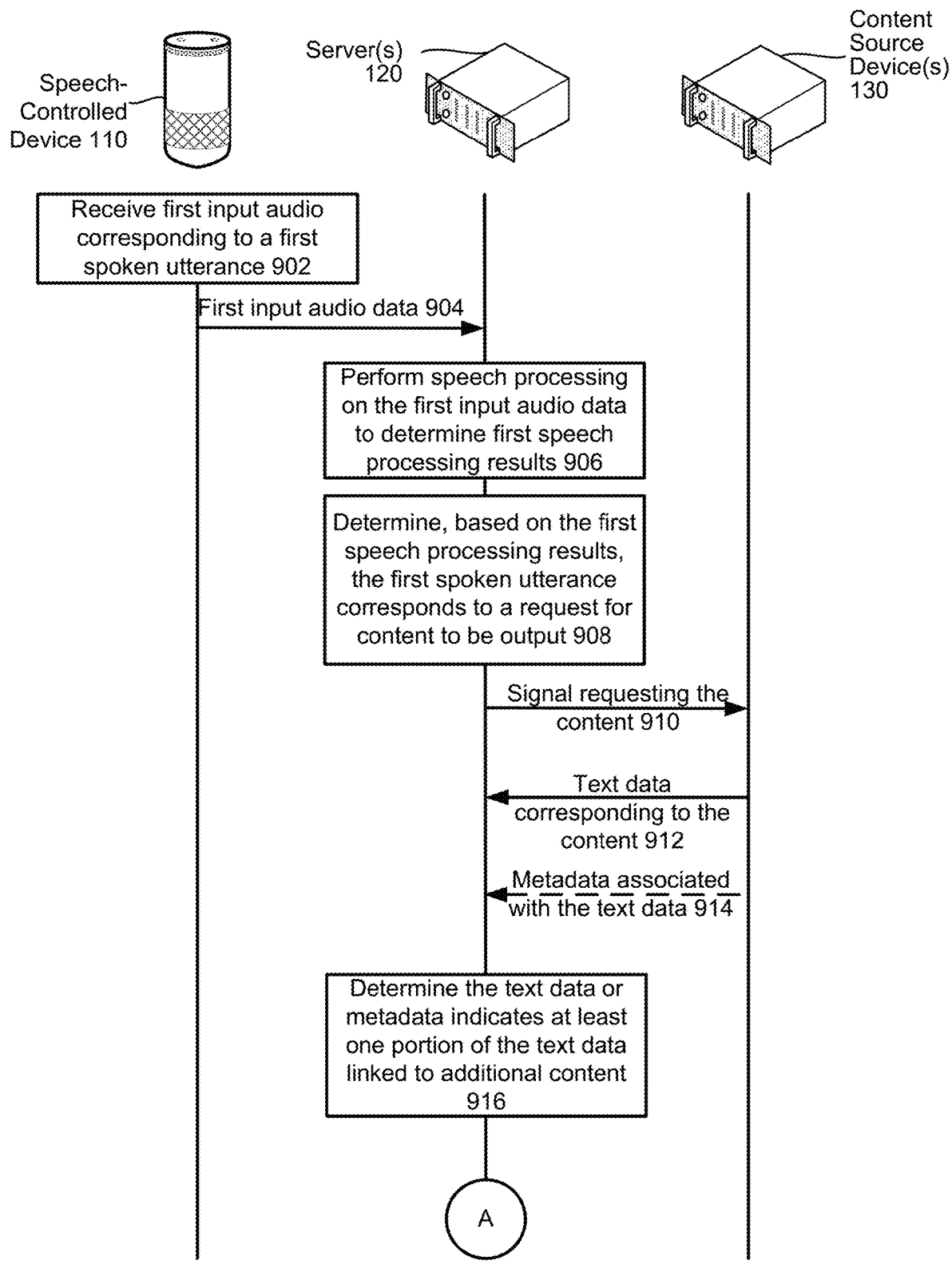
FIGS. 9A through 9C are a signal flow diagram illustrating indicating linked content in output audio using different voices in the output audio according to embodiments of the present disclosure.
Figure 9B:
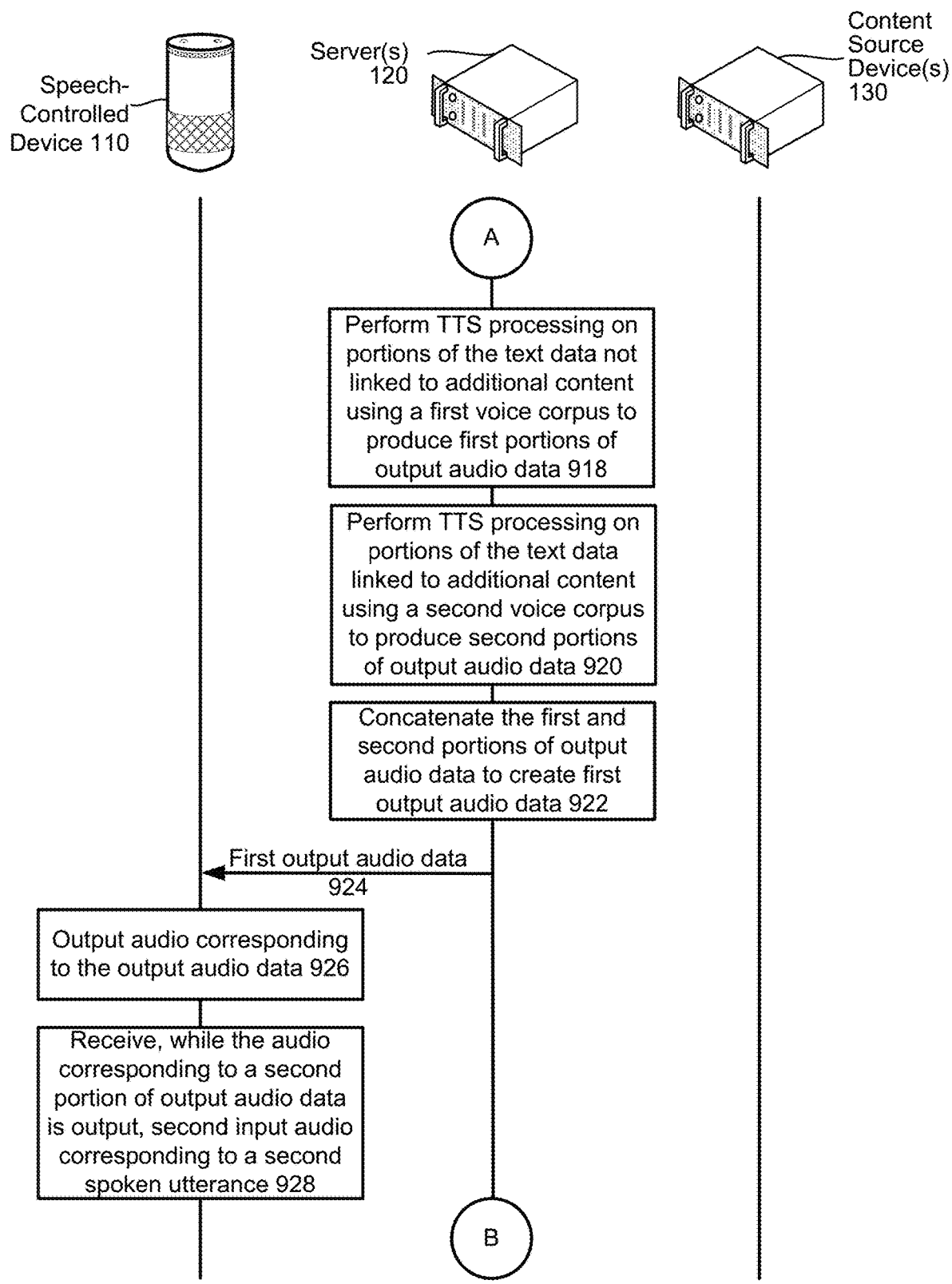
Figure 9C:
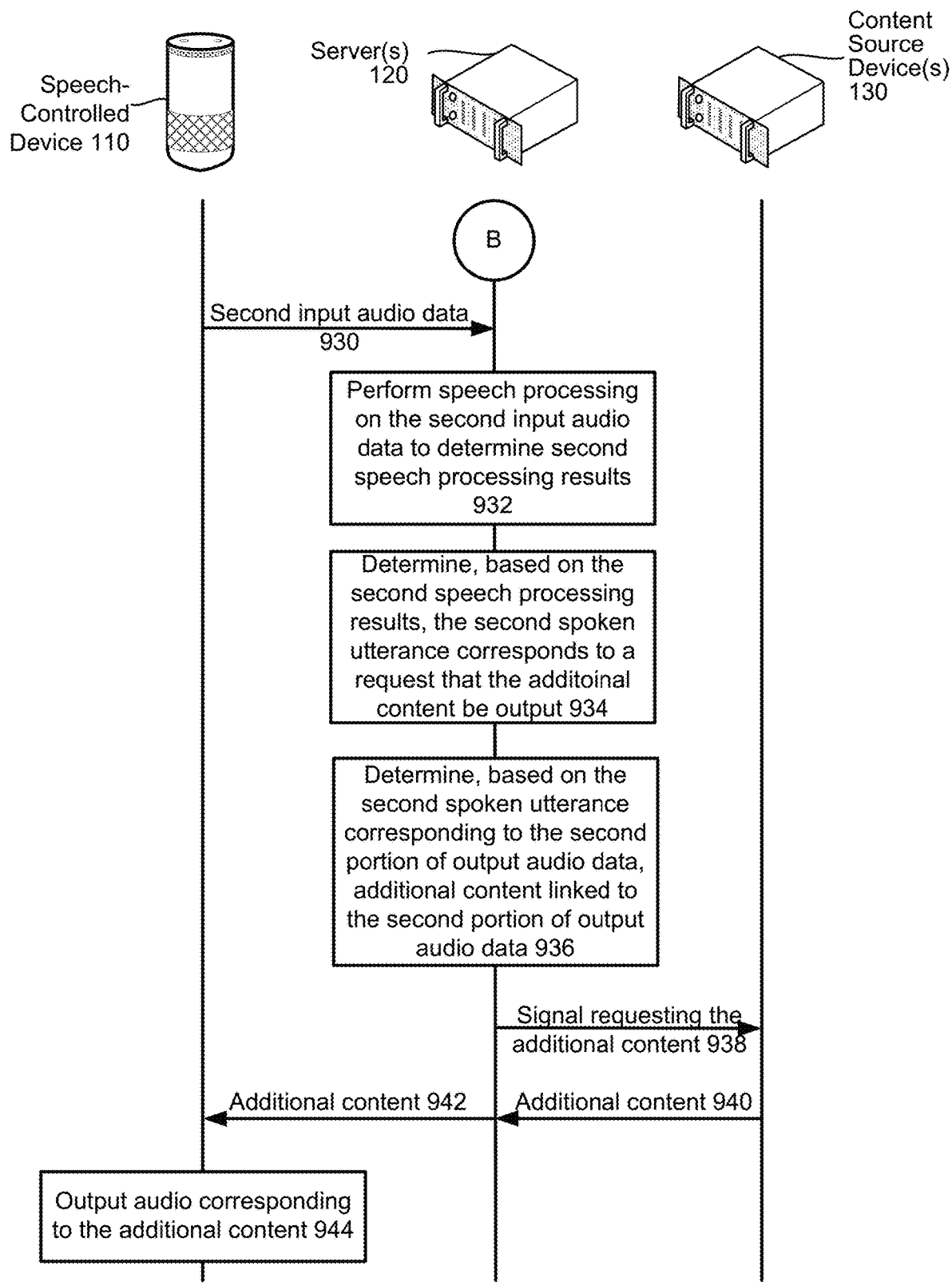

Content may be audibly indicated as linked to additional content. FIGS. 9A through 9C illustrate indicating linked content in output audio using different voices in the output audio. A speech-controlled device 110 receives (902) input audio corresponding to a spoken utterance, and sends (904) input audio data corresponding thereto to the server(s) 120.

The server(s) 120 performs (906) speech processing (e.g., ASR and NLU) on the input audio data to determine speech processing results. Based on the speech processing results, the server(s) 120 determines (908) the spoken utterance corresponds to a request for content to be output by the speech-controlled device 110. The server(s) 120 sends (910), to a content source device(s) 130 storing or having access to the content, a signal requesting the content. The server(s) 120 then receives (912) text data corresponding to the content. The server(s) 120 may optionally receive (914) metadata associated with the text data.

The server(s) 120 determines (916) the text data, and/or optionally the metadata, indicates at least one portion of the text data is linked to additional content. The server(s) 120 performs (918) TTS processing on portions of the text data not linked to additional content using a first voice corpus to produce first portions of output audio data. Thus, the first portions of output audio data correspond to speech having first audio characteristics (i.e., in a first voice). The server(s) 120 also performs (920) TTS processing on portions of the text data linked to additional content using a second voice corpus to produce second portions of output audio data. Thus, the second portions of output audio data correspond to speech having second audio characteristics (i.e., in a second voice). The first audio characteristics and the second audio characteristics (i.e., the first voice and the second voice) should be different enough to convey to a user audio/content that is not linked to additional content from audio/content linked to additional content. The audio characteristics may include volume, tone, speed, pitch, reverberation, mood, or a variety of other characteristics that describe the audio of the synthesized speech. Thus, the first portion of the synthesized speech/audio (i.e., the portion not associated with linked content) and the second portion of synthesized speech/audio (i.e., the portion associated with linked content) should sound different. The server(s) 120 may then concatenate (922) the first and second portions of output audio data to create a single set of output audio data corresponding to the requested content, and having different voices. The server(s) 120 sends (924) the output audio data to the speech-controlled device 110 (or another user device associated with the same user profile).

The speech-controlled device 110 (or other device) outputs (926) audio corresponding to the output audio data. The speech-controlled device 110 receives (928), while or shortly after audio linked to additional content is output, input audio corresponding to a spoken utterance. The speech-controlled device 110 then sends (930) input audio data corresponding to the spoken utterance to the server(s) 120.

The server(s) 120 performs (932) speech processing (e.g., ASR and NLU) on the input audio data to determine speech processing results. Based on the speech processing results, the server(s) 120 determines (934) the spoken utterance corresponds to a request that the additional content be output. Such determination may involve determining words in the spoken utterance matches words of the linked audio. This allows the server(s) 120 to properly determine a user's request when the user speaks an entirety of the linked audio back to the speech-controlled device 110. Such determination may alternatively involve determining words in the spoken utterance meet or exceed a threshold number of words in the linked audio. This allows the server(s) 120 to properly determine a user's request when the user only speaks a portion of the linked audio back to the speech-controlled device 110. Such determination may alternatively include determining words in the spoken utterance correspond to a navigation command (e.g., "go forward", "go backward", etc.). For example, an utterance of "go forward" may be interpreted as a user intent to invoke the linked additional content. The server(s) 120 may then determine (936) the additional content and a content source device(s) 130 storing or having access to the additional content. The server(s) 120 sends (938), to the determined content source device(s) 130, a signal requesting the additional content. When the server(s) 120 receives (940) the additional content as audio data from the content source device(s) 130, the server(s) 120 sends or forwards (942) the additional content audio data to the speech-controlled device 110 (or other user device associated with the same user profile), and the speech-controlled device 110 (or other device) outputs (944) audio corresponding to the additional content audio data. Alternatively, if the additional content is embodied as audio data, the server(s) 120 may simply instruct the content source device(s) 130 to send the additional content audio data directly to the speech-controlled device 110, for output to a user. If the server(s) 120 receives the additional content as text data from the content source device(s) 130, the server(s) 120 may perform TTS on the additional content text data to produce the additional content audio data, and then send the additional content audio data to the speech-controlled device.

As described with respect to FIGS. 9A through 9C, the spoken utterances usable to invoke linked content may include utterances that match or include portions of the output audio (i.e., the user speaks to the system one or more word(s) in the synthesized speech that are associated with the linked content), or may include system configured commands (e.g., go backward, go forward, etc.). In addition, the vocabulary or speech usable by a user to invoke additional content may include portions of the additional linked content. For example, headers, section titles, etc. of the additional linked content may be spoken by the user to invoke the additional content. Those words may not necessarily be words that are included in the words of the synthesized speech. For example, a restaurant's menu may include various section, such as pizza, salad, etc. When the system outputs speech corresponding to the restaurant, the words "review our menu" may be words of the output synthesized speech that are associated with linked content. In response to the user recognizing the words "review our menu" are associated with linked content (e.g., user recognition of the audible indicators surrounding "review our menu" or alternate voice of "review our menu"), the user may speak "tell me about the pizza options" to invoke linked additional content corresponding to the pizza portion of the menu.

To enable such operations, the server(s) 120 may analyze the additional content to determine the headers, sections, etc. The server(s) 120 may also receive metadata indicating the headers, sections, etc. The metadata indicating the headers, sections, etc. may be the same as or different from the metadata including specifics of the text data corresponding to the originally output audio. The server(s) 120 may then configure speech processing components/operations (e.g., NLU functionality) to recognize words that a user may speak to invoke and request the additional content. It should be appreciated that the additional content may be different content from the originally output content, or the additional content may be a portion of the originally output content (e.g., the originally output content may include a menu, and the additional content may be a pizza portion of the menu).

In some instances, the server(s) 120 may access the additional content after the user invokes such via the linked audio. Alternatively, the server(s) 120 may gather the content and the additional content prior to outputting the audio with the links to the user. In this situation, when the user invokes the linked additional content, the server(s) 120 already has access to such content, and can simply output such. For example, the server(s) 120 can obtain the main page of a menu and subpages of the menu in response to the user requesting the menu be output. If the output device outputs the main page and the user requests a subpage being output, the server(s) 120 can simply output audio corresponding to text of the subpage without having to gather content of the subpage from a third party device.

The server(s) 120 may create output audio data including indications of linked content based on characteristics of the output device. For example, content may include links to visual content as well as links to audible content. If the output device is headless (i.e., does not include a display), the server(s) 120 may create output audio data including link indications with respect to the audio additional content, but not link indications with respect to the visual additional content. If the headless output device is indicated in a user profile along with a device including a display, the server(s) 102 may include link indications with respect to both the visual and audible additional content in the output audio data. In this situation, if the user invokes audible additional content, the server(s) 120 may send the additional content to the headless output device, whereas if the user invokes the visual additional content, the server(s) 120 may send the additional content to the device with the display. If this occurs, the server(s) 120 may cause the headless device to indicate to the user that the invoked content is being output by the other device.

As described herein, content may be received as text data. It should also be appreciated that content may be received as audio data, video data, or other data that may (in whole or in part) be passed through, or processed to pass through, a visual user interface. In addition, the additional content may be audio data, video data, or other form of data.

As described with respect to FIGS. 9A through 9C, the server(s) 120 may receive the content text data from the content source device(s) 130 after the server(s) 120 receives input audio data corresponding to a request for the content to be output from the speech-controlled device 110. Alternatively, the server(s) 120 may receive the content text data from the content source device(s) 130 (e.g., cache the content text data) prior to the server(s) 120 receiving the input audio data corresponding to the request for the content to be output. For example, after an entity controlling the content source device(s) 130 becomes affiliated with an entity controlling the server(s) 120, the content source device(s) 130 may be electrically coupled to the server(s) 120 such that the content source device(s) 130 may supply the server(s) 120 with content text data without the server(s) 120 soliciting the content text data (i.e., the content source device(s) 130 may push the content text data to the server(s) 120).

Figure 10:
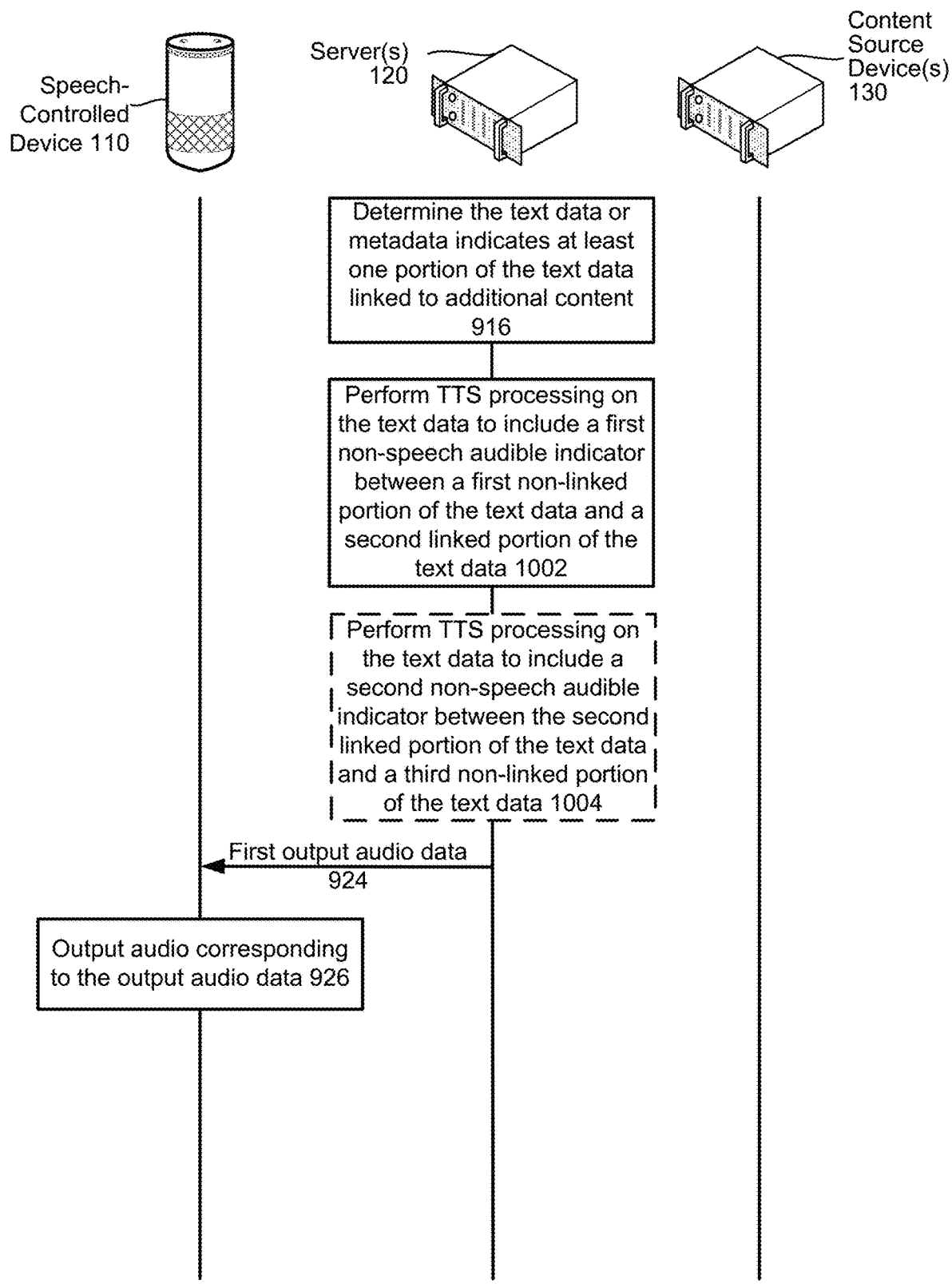
FIG. 10 is a signal flow diagram illustrating indicating linked content in output audio using non-speech audible indicators according to embodiments of the present disclosure.

FIG. 10 illustrates indicating linked content in output audio using non-speech audible indicators. The server(s) 120 determines (916) the text data or metadata indicates at least one portion of the text data linked to additional content. The server(s) 120 performs TTS processing on the text data to create output audio data. Specifically, the server(s) 120 performs (1002) TTS processing on the text data to include a first non-speech audible indicator (e.g., a beep or other audio waveform) between a first portion of the text data not linked to additional content and a second portion of the text data linked to additional content. This results in the output audio data having a non-speech audible indicator located at or proximate to a beginning of linked audio data. The non-speech audible indicator located as such indicates to a user the beginning of audio linked to additional content.

If the output audio data is configured to only include the non-speech audible indicator located at or proximate to the beginning of linked audio data, the user may have doubt as to the end of the linked audio output to the user. As such, the server(s) 120 may also perform (1004) TTS processing on the text data to include a second non-speech audible indicator between the second portion of the text data linked to additional content and a third portion of the text data not linked to additional content. This results in the output audio data having a non-speech audible indicator located at or proximate to an end of the linked audio data. By having the non-speech audible indicators located at or proximate to both the beginning and end of the linked audio, the system is able to adequately convey to a user the entirety of the linked audio output to the user.

The server(s) 120 then sends (924) the output audio data to the speech-controlled device 110, and the speech-controlled device 110 outputs (926) audio corresponding to the output audio data.

Figure 11:
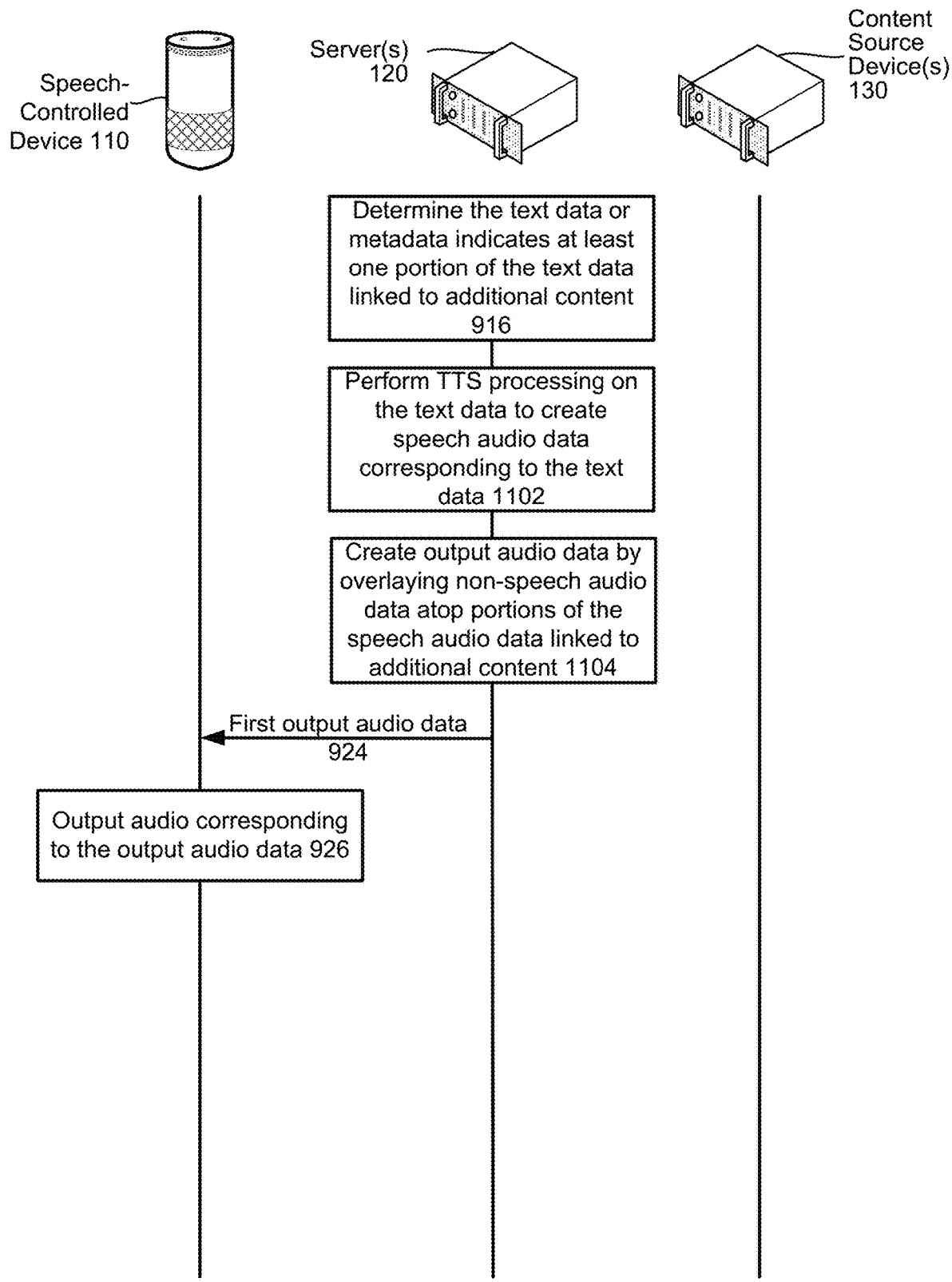
FIG. 11 is a signal flow diagram illustrating indicating linked content in output audio by overlaying non-speech audio data atop speech audio data according to embodiments of the present disclosure.

FIG. 11 illustrates indicating linked content in output audio by overlaying non-speech audio atop of speech audio. The server(s) 120 determines (916) the text data or metadata indicates at least one portion of the text data linked to additional content. The server(s) 120 performs (1102) TTS processing on the text data to create speech audio data corresponding to the text data. The server(s) 120 then creates (1104) output audio data by overlaying non-speech audio data atop portions of the speech audio data linked to additional content. This results in background audio being output at the same time as audio linked to additional content. The server(s) 120 then sends (924) the output audio data to the speech-controlled device 110, and the speech-controlled device 110 outputs (926) audio corresponding to the output audio data.

Figure 12:
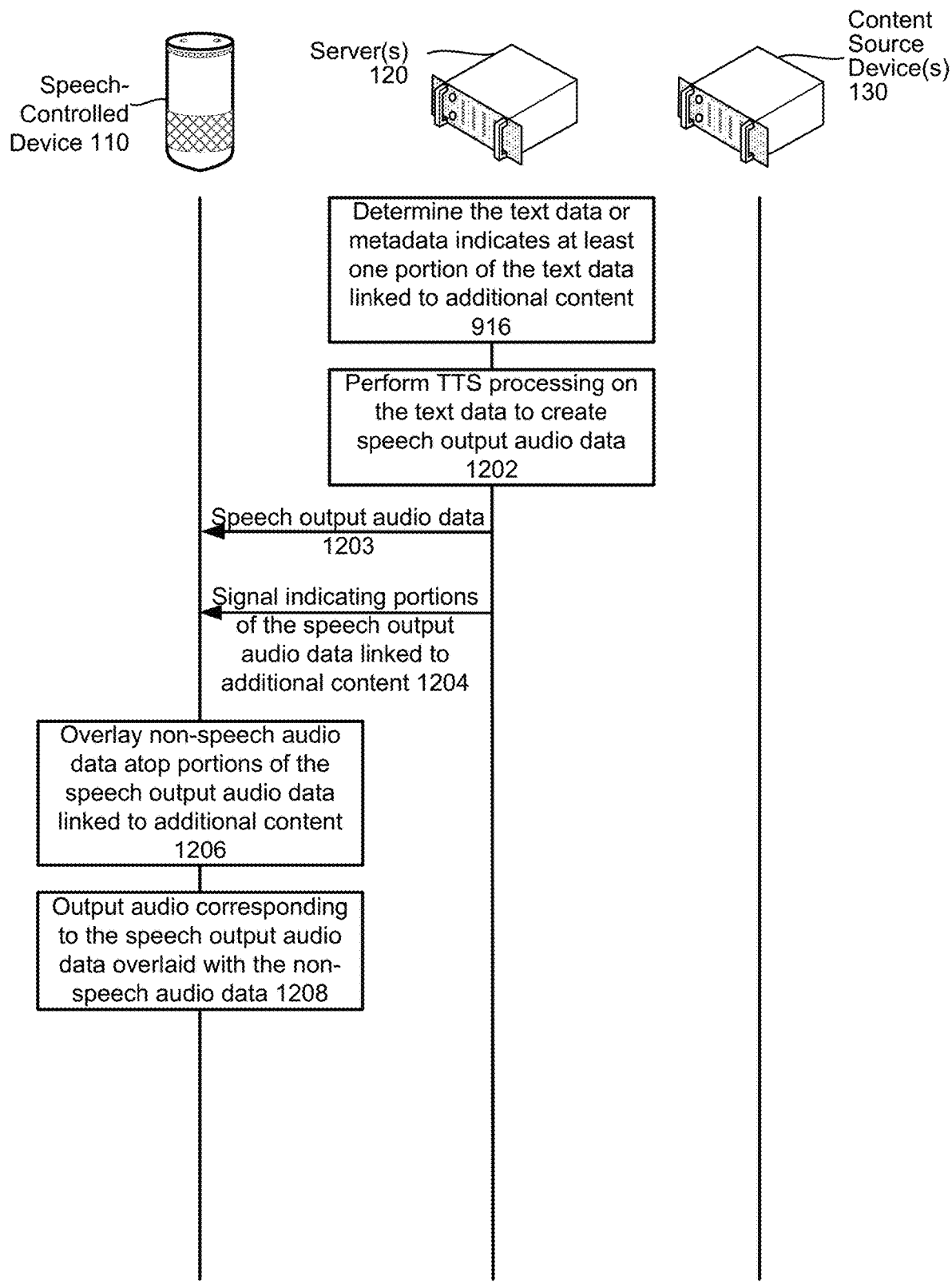
FIG. 12 is a signal flow diagram illustrating indicating linked content in output audio by overlaying non-speech audio data atop speech audio data according to embodiments of the present disclosure.

As detailed above with respect to FIG. 11, the server(s) 120 may overlay non-speech audio data atop speech audio data linked to additional content. Alternatively, the speech-controlled device 110 may store the non-speech audio data, and may overlay the non-speech audio data atop the speech audio data (as illustrated in FIG. 12). The server(s) 120 determines (916) the text data or metadata indicates at least one portion of the text data linked to additional content. The server(s) 120 performs (1202) TTS processing on the text data to create speech output audio data. The server(s) 120 sends (1203) the speech output audio data to the speech-controlled device 110. The server(s) 120 also sends (1204)

a signal to the speech-controlled device 110 indicating portions of the speech output audio data linked to additional content. The speech-controlled device 110 overlays (1206) non-speech audio data (stored by the speech-controlled device 110 or accessable by the speech-controlled device 110) atop portions of the speech output audio data linked to additional content. The speech-controlled device 110 then outputs (1208) audio corresponding to the speech output audio data overlaid with the non-speech audio data.

The server(s) 120 may send a speech-controlled device 110 output audio data, and a signal indicating that non-speech audible indicators are to be inserted into the output audio data. The signal may also include where in the output audio data the non-speech audible indicators should be inserted. The speech-controlled device 110 may locally store the non-speech audible indicators and may insert such into the output audio data.

The server(s) 120 may receive text data including links to multiple kinds of different additional content, such as links to video content, links to textual content, links to audible content, etc. The server(s) 120 may be configured to indicate linked content to a user based on specifics of the output device (e.g., the speech-controlled device 110). For example, if the output device is configured with speakers, but not a display, the server(s) 120 may not indicate to a user content linked to video content or textual content.

FIG. 13 is a block diagram conceptually illustrating a user device (e.g., the speech-controlled device 110 described herein) that may be used with the described system. FIG. 14 is a block diagram conceptually illustrating example components of a remote device, such as the server(s) 120 that may assist with ASR processing, NLU processing, or command processing. Multiple servers 120 may be included in the system 100, such as one server 120 for performing ASR, one server 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (1304/1404), that may each include a central processing unit (CPU) for processing data and computer-readable instructions, and a memory (1306/1406) for storing data and instructions of the respective device. The memories (1306/1406) may individually include volatile random access memory (RAM), non-volatile read only memory (ROM), non-volatile magnetoresistive (MRAM) and/or other types of memory. Each device (110/120) may also include a data storage component (1308/1408), for storing data and controller/processor-executable instructions. Each data storage component may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1302/1402).

Computer instructions for operating each device (110/120) and its various components may be executed by the respective device's controller(s)/processor(s) (1304/1404), using the memory (1306/1406) as temporary "working" storage at runtime. A device's computer instructions may be stored in a non-transitory manner in non-volatile memory (1306/1406), storage (1308/1408), or an external device(s). Alternatively, some or all of the executable instructions may be embedded in hardware or firmware on the respective device in addition to or instead of software.

Each device (110/120) includes input/output device interfaces (1302/1402). A variety of components may be connected through the input/output device interfaces (1302/1402), as will be discussed further below. Additionally, each device (110/120) may include an address/data bus (1324/1424) for conveying data among components of the respective device. Each component within a device (110/120) may also be directly connected to other components in addition to (or instead of) being connected to other components across the bus (1324/1424).

Referring to FIG. 13, the device 110 may include input/output device interfaces 1302 that connect to a variety of components such as an audio output component such as a speaker 101, a wired headset or a wireless headset (not illustrated), or other component capable of outputting audio. The device 110 may further include a visual output component such as a display 802. The device 110 may also include an audio capture component. The audio capture component may be, for example, a microphone 103 or array of microphones, a wired headset or a wireless headset (not illustrated), etc. If an array of microphones is included, approximate distance to a sound's point of origin may be determined by acoustic localization based on time and amplitude differences between sounds captured by different microphones of the array.

For example, via antenna(s) 1314, the input/output device interfaces 1302 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 and/or the server(s) 120 may include an ASR component 250. The ASR component 250 in the device 110 may be of limited or extended capabilities. The ASR component 250 may include the language models 254 stored in ASR model storage component 252. If limited speech recognition is included, the ASR component 250 may be configured to identify a limited number of words, whereas extended speech recognition may be configured to recognize a much larger range of words.

The device 110 and/or the server(s) 120 may include a limited or extended NLU component 260. The NLU component 260 in the device 110 may be of limited or extended capabilities. The NLU component 260 may comprise the name entity recognition component 262, the intent classification component 264, and/or other components. The NLU component 260 may also include a stored knowledge base and/or entity library, or those storages may be separately located.

The device 110 and/or the server(s) 120 may also include the command processor 290 configured to execute commands/functions associated with a spoken utterance as described herein.

To determine the user that spoke a command/utterance, the server(s) 120 may be configured with the user recognition component 295 described in detail herein above.

To create output speech, the server(s) 120 may be configured with the TTS component 314 described in detail herein above.

As noted above, multiple devices may be employed in a single speech processing system. In such a multi-device system, each of the devices may include different components for performing different aspects of the speech processing. The multiple devices may include overlapping components. The components of the device 110 and the server(s) 120, as illustrated in FIGS. 13 and 14, are exemplary, and may be located as a stand-alone device or may be included, in whole or in part, as a component of a larger device or system.

As illustrated in FIG. 15, multiple devices (120, 130, 110a-110e) may contain components of the system 100 and the devices may be connected over a network(s) 199. The network(s) 199 may include a local or private network or may include a wide network such as the Internet. Devices may be connected to the network(s) 199 through either wired or wireless connections. For example, the speech-controlled device 110a, a smart phone 110b, a smart watch 110c, a tablet computer 110d, and/or a vehicle 110e may be connected to the network(s) 199 through a wireless service provider, over a WiFi or cellular network connection, or the like. Other devices are included as network-connected support devices, such as the server(s) 120, the content source device(s) 130, or others. The support devices may connect to the network(s) 199 through a wired connection or wireless connection. Networked devices may capture audio using one-or-more built-in or connected microphones 103 or audio capture devices, with processing performed by ASR, NLU, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the components and engines may be implemented as in firmware or hardware, such as the AFE 256, which comprises, among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computing system comprising:
at least one processor; and
memory storing instructions that, when executed, cause the at least one processor to:
receive text data corresponding to first content, the text data including a first text portion and a second text portion, wherein the second text portion includes a hypertext markup language (HTML) link to second content, the HTML link including a uniform resource locator (URL) link;
receive, from a speech-controlled device, first input audio data corresponding to a first spoken utterance;
perform speech processing on the first input audio data;
determine the first spoken utterance corresponds to a request for the first content, the request associated with a first device;
perform text-to-speech (TTS) processing on the first text portion using a first TTS voice corpus to produce first synthesized speech representing the first text portion;
perform TTS processing on the second text portion using a second TTS voice corpus to produce second synthesized speech representing the second text portion;
determine the second text portion is associated with additional content different from the first content;
determine the additional content corresponds to an output capability of the first device;
based at least in part on the additional content corresponding to the output capability of the first device, determine output audio data including the first synthesized speech and the second synthesized speech;
cause the speech-controlled device to emit first audio corresponding to the output audio data;
receive, from the speech-controlled device, second input audio data corresponding to a second spoken utterance;
perform speech processing on the second input audio data;
determine the second spoken utterance corresponds to an instruction to receive the additional content;
analyze, based at least in part on the first device, the instruction to determine a portion of the additional content;
receive, from at least one remote device, the portion of the additional content; and
cause, using the URL link, the speech-controlled device to emit second audio corresponding to the portion of the additional content.

2. The computing system of claim 1, wherein the instructions further cause the at least one processor to:
generate a non-speech audible indicator between the first synthesized speech and the second synthesized speech in the output audio data, the non-speech audible indicator representing that the second synthesized speech is linked to the second content.

3. The computing system of claim 1, wherein the instructions further cause the at least one processor to:
generate a first non-speech audible indicator proximate to a beginning of the second synthesized speech within the output audio data, and a second non-speech audible audio indicator proximate to an end of the second synthesized speech within the output audio data, the first and second non-speech audible indicators represented that the second synthesized speech is linked to the second content.

4. The computing system of claim 1, wherein the instructions cause the at least one processor to determine the second spoken utterance corresponds to the instruction to receive the additional content by:
determining a first string of words in the second spoken utterance corresponds to a second string of words corresponding to the second synthesized speech; or
determining content in the second spoken utterance corresponds to a portion of the second synthesized speech.

5. A computing system comprising:
at least one processor; and
memory including instructions operable to be executed by the at least one processor to configure the system to:
receive first data corresponding to first content, the first data including a first portion and a second portion;
receive a first request for the first content, the first request associated with a first device;
generate first synthesized speech corresponding to the first portion, the first synthesized speech corresponding to first audio characteristics;
determine the second portion is associated with additional content different from the first content;
determine the additional content corresponds to an output capability of the first device; and
based at least in part on the additional content corresponding to the output capability of the first device, generate second synthesized speech corresponding to the second portion, the second synthesized speech corresponding to second audio characteristics, different from the first audio characteristics, the second audio characteristics indicating the second synthesized speech is associated with additional content.

6. The computing system of claim 5, wherein the memory further comprises instructions that further configure the system to:
receive second data associated with the first data, the second data indicating the second portion, and a location in the first data corresponding to the second portion.

7. The computing system of claim 5, wherein the memory further comprises instructions that further configure the system to:
determine output audio data including the first synthesized speech and the second synthesized speech;
send the output audio data;
cause the first device to emit audio data corresponding to the output audio data; and
receive, from the first device, input audio data including a spoken utterance, the spoken utterance corresponding to an instruction to emit the additional content, the spoken utterance being received subsequent to the first device emitting the first synthesized speech but prior to the first device emitting audio corresponding to an entirety of the output audio data.

8. The computing system of claim 5, wherein the memory further comprises instructions that further configure the system to:
determine output audio data including the first synthesized speech and the second synthesized speech;
generate a first non-speech audible indicator proximate to a beginning of the second synthesized speech within the output audio data, and a second non-speech audible indicator proximate to an end of the second synthesized speech within the output audio data.

9. The computing system of claim 5, wherein the memory further comprises instructions that further configure the system to:
determine output audio data including the first synthesized speech and the second synthesized speech;
generate second data associated with the output audio data, the second data indicating a location within the output audio data corresponding to the second synthesized speech; and
send, to the first device, the second data, the second data causing the first device to emit output audio stored on the first device, the output audio indicating the second synthesized speech is associated with the additional content.

10. The computing system of claim 7, wherein the memory further comprises instructions that further configure the system to:
receive a reply responsive to the output audio data;
perform speech processing on the reply to determine the reply corresponds to a request to receive the additional content;
determine the spoken utterance corresponds to the request to output the additional content based on at least one of:
the spoken utterance including speech corresponding to at least one of a section or header of the additional content; or
the spoken utterance including a first string of speech corresponding to a second string of speech of the second synthesized speech.

11. The computing system of claim 5, wherein the memory further comprises instructions that further configure the system to:
send, to the first device, a signal causing the first device to visually indicate the second synthesized speech is associated with further content.

12. The computing system of claim 5, wherein the memory further comprises instructions that further configure the system to:
determine output audio data including the first synthesized speech and the second synthesized speech; and
overlay the second synthesized speech with a non-speech audible indicator within the output audio data, the non-speech audible indicator representing that the second synthesized speech is associated with additional content.

13. A computer-implemented method comprising:
receiving first data corresponding to first content, the first data including a first portion and a second portion;
receiving a first request for the first content, the first request associated with a first device;
generating first synthesized speech corresponding to the first portion, the first synthesized speech corresponding to first audio characteristics;
determining the second portion is associated with additional content different from the first content;
determining the additional content corresponds to an output capability of the first device; and
based at least in part on the additional content corresponding to the output capability of the first device, generating second synthesized speech corresponding to the second portion, the second synthesized speech corresponding to second audio characteristics different from the first audio characteristics, the second audio characteristics indicating the second synthesized speech is associated with additional content.

14. The computer-implemented method of claim 13, further comprising:
   receiving second data associated with the first data, the second data indicating the second portion, and a location in the first data corresponding to the second portion.

15. The computer-implemented method of claim 13, further comprising:
   determining output audio data including the first synthesized speech and the second synthesized speech;
   sending the output audio data;
   causing the first device to emit audio corresponding to the output audio data; and
   receiving, from the first device, input audio data including a spoken utterance, the spoken utterance corresponding to an instruction to emit the additional content, the spoken utterance being received subsequent to the first device emitting the first synthesized speech but prior to the first device emitting an entirety of the output audio data.

16. The computer-implemented method of claim 13, further comprising:
   determining output audio data including the first synthesized speech and the second synthesized speech; and
   generating a first non-speech audible indicator proximate to a beginning of the second synthesized speech within the output audio data, and a second non-speech audible indicator proximate to an end of the second synthesized speech within the output audio data.

17. The computer-implemented method of claim 13, further comprising:
   determining output audio data including the first synthesized speech and the second synthesized speech;
   generating second data associated with the output audio data, the second data indicating a location within the output audio data corresponding to the second synthesized speech; and
   sending, to the first device, the second data, the second data causing the first device to emit output audio stored on the first device, the output audio indicating the second synthesized speech is associated with the additional content.

18. The computer-implemented method of claim 15, further comprising:
   receiving a reply responsive to the output audio data;
   performing speech processing on the reply to determine the reply corresponds to a request to receive the additional content; and
   determining the spoken utterance corresponds to the request to output the additional content based on at least one of:
      the spoken utterance including speech corresponding to at least one of a section or header of the additional content; or
      the spoken utterance including a first string of speech corresponding to a second string of speech of the second synthesized speech.

19. The computer-implemented method of claim 13, further comprising:
   sending, to the first device, a signal causing the first device to visually indicate the second synthesized speech is associated with further content.

20. The computer-implemented method of claim 13, further comprising:
   determining output audio data including the first synthesized speech and the second synthesized speech;
   overlaying the second synthesized speech with a non-speech audible indicator within the output audio data, the non-speech audible indicator representing that the second synthesized speech is associated with additional content.

21. The computing system of claim 5, wherein the memory further comprises instructions that further configure the system to:
   determine a device type of the first device; and
   cause, based at least in part on the device type, at least a portion of the additional content to be output.

22. The computing system of claim 5, wherein the second portion includes a hypertext markup language (HTML) link, the HTML link including a uniform resource locator (URL) link.

23. The computer-implemented method of claim 13, further comprising:
   analyzing the additional content to determine a subsection;
   receiving second data indicating the subsection associated with the additional content; and
   causing, based at least in part on the subsection associated with the additional content, at least a portion of second content to be output.

24. The computing system of claim 5, further comprising:
   determine output audio data including the first synthesized speech and the second synthesized speech;
   send the output audio data to the first device;
   receive reply data responsive to the output audio data;
   perform speech processing on the reply data to determine the reply data corresponds to a second request to receive the additional content;
   receive, from at least one remote device, a portion of the additional content; and
   cause, based at least in part on the second request, at least the portion of the additional content to be output using the first device.

25. The computing system of claim 5, wherein the first device includes a display.

26. The computing system of claim 5, wherein the first device is a headless device.

* * * * *